(12) United States Patent
Toyota

(10) Patent No.: US 12,572,137 B2
(45) Date of Patent: Mar. 10, 2026

(54) REMOTE SYSTEM, REMOTE CONNECTION METHOD AND COMPUTER READABLE STORAGE MEDIUM

(71) Applicant: Mitsubishi Electric Corporation, Tokyo (JP)

(72) Inventor: Masaharu Toyota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 62 days.

(21) Appl. No.: 18/032,566

(22) PCT Filed: May 28, 2021

(86) PCT No.: PCT/JP2021/020333
§ 371 (c)(1),
(2) Date: Apr. 19, 2023

(87) PCT Pub. No.: WO2022/249435
PCT Pub. Date: Dec. 1, 2022

(65) Prior Publication Data
US 2024/0028013 A1 Jan. 25, 2024

(51) Int. Cl.
*G05B 19/418* (2006.01)
(52) U.S. Cl.
CPC ... *G05B 19/41855* (2013.01); *G05B 19/4183* (2013.01)
(58) Field of Classification Search
USPC .......................................................... 700/9
See application file for complete search history.

(56) References Cited

U.S. PATENT DOCUMENTS 7,072,987 B2 * 7/2006 Jurisch ................. G05B 19/042
709/224
8,170,694 B2 5/2012 Nakamura
(Continued)

FOREIGN PATENT DOCUMENTS

JP 2006-148661 A 6/2006
JP 2015-087852 A 5/2015
(Continued)

OTHER PUBLICATIONS

WO_2004070568_A2 (Year: 2004).*
(Continued)

*Primary Examiner* — Hien D Khuu
(74) *Attorney, Agent, or Firm* — XSENSUS LLP

(57) ABSTRACT

In a remote system, a local area network including a production device and a gateway device is connected to a server device via a wide area network. The remote system includes a network device that permits connection from an inside to an outside of the local area network and rejects connection from the outside to the inside. The gateway device requests the server device to establish a first session between the gateway device and the server device. The server device compares device identification information for identifying a target production device designated by the external terminal with device identification information set to the production device, establishes the first session in response to a request for establishment of the first session, establishes a second session between the server device and the external terminal when both of pieces of the device identification information matches, and links the first session and the second session.

15 Claims, 23 Drawing Sheets

(56) References Cited

U.S. PATENT DOCUMENTS

| | | | |
|---|---|---|---|
| 10,168,675 | B2 | 1/2019 | Hashimoto et al. |
| 10,225,133 | B2 | 3/2019 | Sakakura |
| 11,397,821 | B2 | 7/2022 | Oya et al. |
| 2006/0126603 | A1 | 6/2006 | Shimizu et al. |
| 2006/0270448 | A1* | 11/2006 | Huotari ................. H04L 63/162 455/552.1 |
| 2010/0329209 | A1* | 12/2010 | Akselsen .......... H04W 36/1446 370/401 |
| 2013/0332996 | A1* | 12/2013 | Fiala ........................ G06F 21/53 709/227 |
| 2016/0014088 | A1* | 1/2016 | Maekawa ............. H04L 63/029 726/12 |
| 2016/0337384 | A1* | 11/2016 | Jansson ............... H04L 65/1045 |
| 2017/0006006 | A1* | 1/2017 | Rawcliffe ............... H04L 63/08 |
| 2017/0339153 | A1* | 11/2017 | Isola ..................... H04L 63/101 |
| 2020/0294636 | A1* | 9/2020 | Ansari .................... H04L 63/08 |
| 2021/0349446 | A1 | 11/2021 | Tahara et al. |
| 2022/0303150 | A1* | 9/2022 | Jensen ............... H04L 12/1827 |

FOREIGN PATENT DOCUMENTS

| | | | |
|---|---|---|---|
| JP | 2019-062277 | A | 4/2019 |
| JP | 2020-088690 | A | 6/2020 |
| WO | 2007/055046 | A1 | 5/2007 |
| WO | 2015/140908 | A1 | 9/2015 |

OTHER PUBLICATIONS

WO_2019058612_A1 (Year: 2019).*

Indian Office Action issued Jul. 1, 2024, in corresponding Indian Patent Application No. 202327030151, 5pp.

International Search Report and Written Opinion mailed on Aug. 10, 2021, received for PCT Application PCT/JP2021/020333, filed on May 28, 2021, 10 pages including English Translation.

Notice of Reasons for Refusal mailed on Feb. 8, 2022, received for JP Application 2021-566553, 8 pages including English Translation.

Decision to Grant mailed on Apr. 26, 2022, received for JP Application 2021-566553, 5 pages including English Translation.

* cited by examiner

FIG.3

| DEVICE MAC ADDRESS | DEVICE IP ADDRESS | DEVICE HOST NAME | DEVICE IDENTIFIER |
|---|---|---|---|
| 00:26:92:AA:AA:01 | 10.10.1.254 | R120CPU | 7cfbc654-83ef-46c0-b028-e1a4fec4edf1 |
| 10:4B:46:AA:AA:02 | 10.18.1.254 | FX5U-32MR/ES | 6462ff02-29c8-4cb3-a323-9295e295e656 |
| 28:E9:8E:AA:AA:03 | 10.54.1.254 | GT2710-VTBA | fd1282e5-db56-4371-8d4f-94c0bf701c66 |
| 30:BE:3B:AA:AA:04 | 10.54.1.254 | GT2512-STBA | f73d5ec5-6968-4fef-ad7b-6aeb2d9b2bd5 |
| 38:E0:8E:AA:AA:05 | 10.118.1.254 | FREQROL-A800 | d9c6c6be-55e7-48ab-a343-108ffdda0432 |
| 58:52:8A:AA:AA:06 | 10.118.2.254 | Q01CPU | 07c13565-4573-47ba-bd78-e7639ad255df |
| 24:4B:FE:9A:9D:A4 | 10.10.1.254 | MyComputer | ee1ca1b0-2b04-4416-aafc-e2a828d45274 |

FIG.4

| SETTING ITEM (Key) | SETTING VALUE (Value) |
|---|---|
| CLOUD SYSTEM SERVER DEVICE FQDN | gateway.example.com |
| GATEWAY ID | aaa_factory_gw01 |
| GATEWAY PW | d9bbcf85496ddc85e9b1c856de8abfe9e5ab 12632779e0851c43d1639683f791 |

FIG.5

| DEVICE NAME | DEVICE IDENTIFIER | GATEWAY ID |
|---|---|---|
| PRODUCTION DEVICE FOR RAILROAD TRANSPORTATION | 7cfbc654-83ef-46c0-b028-e1a4fec4edf1 | aaa_factory_gw01 |
| POWER RECEIVING APPARATUS PRODUCTION DEVICE | 6462ff02-29c8-4cb3-a323-9295e295e656 | bbb_factory_gw01 |
| UNSET 1 | fd1282e5-db56-4371-8d4f-94c0bf701c66 | ccc_factory_gw01 |
| UNSET 2 | f73d5ec5-6968-4fef-ad7b-6aeb2d9b2bd5 | ccc_factory_gw01 |
| UNSET 3 | d9c6c6be-55e7-48ab-a343-108ffdda0432 | ddd_factory_gw01 |
| ROBOT PRODUCTION DEVICE | 07c13565-4573-47ba-bd78-e7639ad255df | ddd_factory_gw02 |
| UNSET 4 | ee1ca1b0-2b04-4416-aafc-e2a828d45274 | eee_1stfactory_gw01 |

FIG.6

| GATEWAY ID | GATEWAY PW | GATEWAY NAME |
|---|---|---|
| aaa_factory_gw01 | d9bbcf85496ddc85e9b1c856de8abfe9e5ab12632779e0851c43d1639683f791 | A FACTORY |
| bbb_factory_gw01 | 11c23c0ce2d94d340cc87bd78d946ce343ac5ffcf8e2cd5f995be600d41a1164 | B FACTORY |
| ccc_factory_gw01 | ce3eb302f22931beaedf94d6a34294aa36a82b372902d9367facffcbbfc375f7 | C FACTORY |
| ddd_factory_gw01 | d9b2dcb055a65c8eee933f8a5656f87aede1386e5b5c4fbde6183167fb9fb20b | D FACTORY GW1 |
| ddd_factory_gw02 | 98e61c5f553a78add8bc602a6e5997fad7989ec3d823c00320901989e47c33b0 | D FACTORY GW2 |
| eee_1stfactory_gw01 | 8405d04f4fb266ae6476ac56739bfecb9140949e9e9711b91d0b33eb06d62586 | E FIRST FACTORY |

FIG.10

CONNECTION DEVICE SELECTION

| DEVICE NAME | | DEVICE HOST NAME | GATEWAY NAME | |
|---|---|---|---|---|
| PRODUCTION DEVICE FOR RAILROAD TRANSPORTATION | EDIT | R120CPU | A FACTORY | EDIT |
| POWER RECEIVING APPARATUS PRODUCTION DEVICE | EDIT | FX5U | B FACTORY | EDIT |
| UNSET 1 | EDIT | R08CPU | C FACTORY | EDIT |
| UNSET 2 | EDIT | R08CPU | C FACTORY | EDIT |
| UNSET 3 | EDIT | FREQROL-A800 | D FACTORY GW1 | EDIT |
| ROBOT PRODUCTION DEVICE | EDIT | Q01CPU | D FACTORY GW2 | EDIT |
| UNSET 4 | EDIT | GENERAL PURPOSE COMPUTER | E FIRST FACTORY | EDIT |

CONNECT

| USER ID | USER PW | USER NAME | ACCESS TOKEN |
|---|---|---|---|
| user01 | aad415a73c4cef1ef94a5c00b2642b571a3e54945363328ad960db61889bd9368 | USER 01 | aad415a73c4cef1ef94a5c00b2642b571a3e54945363328ad960db61889bd9368 |
| guest1 | 4676424d5f805a7579abd1236287be2abf24f39b8a622ef587edd7d91b8e2952 | GUEST USER | 4676424d5f805a7579abd1236287be2abf24f39b8a622ef587edd7d91b8e2952 |
| satou2020 | 768ea0e6e8aa36644dac520761f2247ebecbb0c7260280b912d9e6fcd9c54de2 | SATOU | 768ea0e6e8aa36644dac520761f2247ebecbb0c7260280b912d9e6fcd9c54de2 |
| suzuki | d222a18d6474d0819d8ee5da0c2c524f31ff0903a4e6abc3f7957f84f1ee3f0f | SUZUKI | 4949540693f1d539e4fd746e3b80caf76a7d5c0ed25fcc53c348ca303efa374c |

FIG.15

| USER ID | ACCESS AUTHORITY | DEVICE IDENTIFIER |
|---|---|---|
| user01 | PERMITTED | e16b4f62-af92-4e07-a921-efd623583fde |
| guest1 | REJECTED | 6462ff02-29c8-4cb3-a323-9295e295e656 |
| satou2020 | PERMITTED | 7a98fc80-d07e-4a1a-9fd4-db51860d908b |
| ddd_gw01 | PERMITTED | 8545ca48-b870-4c25-94db-97b3836b08c3 |

FIG.16

| USER ID | ACCESS AUTHORITY | GATEWAY ID |
|---|---|---|
| user01 | PERMITTED | aaa_factory_gw01 |
| guest1 | REJECTED | bbb_factory_gw01 |
| satou2020 | PERMITTED | ccc_factory_gw01 |
| ddd_gw01 | PERMITTED | ddd_factory_gw01 |

FIG.17

| GATEWAY ID | GATEWAY PW | GATEWAY NAME | ACCESS TOKEN |
|---|---|---|---|
| aaa_factory_gw01 | d9bbcf85496ddc85e9b1c856de8abfe9e 5ab12632779e0851c43d1639683f791 | A FACTORY | 5a4cd91d-0fa1-4210-a789-e4384696d730 |
| bbb_factory_gw01 | 11c23c0ce2d94d340cc87bd78d946ce3 43ac5ffcf8e2cd5f995be600d41a1164 | B FACTORY | a47fce88-52ab-4e1b-a653-4ee60873815 |
| ccc_factory_gw01 | ce3eb302f22931beaedf94d6a34294aa3 6a82b372902d9367facffcbbfc375f7 | C FACTORY | 374439a9-3442-46dd-bbf7-b541cf4bf8ee |
| ddd_factory_gw01 | d9b2dcb055a65c8eee933f8a5656f87ae de1386e5b5c4fbde6183167fb9fb20b | D FACTORY GW1 | aaca2240-a702-43df-b47e-018edd6e23b8 |
| ddd_factory_gw02 | 98e61c5f553a78add8bc602a6e5997fad 7989ec3d823c003209019889e47c33b0 | D FACTORY GW2 | 0077f669-b79c-491d-88da-3e51e9a47091 |
| eee_1stfactory_gw01 | 8405d04f4fb266ae6476ac56739bfecb91 40949e9e9711b91d0b33eb06d62586 | E FIRST FACTORY | 56bb2590-db2d-4297-a7a2-d77a2f5513f3 |

FIG.18

| SETTING ITEM (Key) | SETTING VALUE (Value) |
|---|---|
| CLOUD SYSTEM SERVER DEVICE FQDN | gateway.example.com |
| GATEWAY ID | aaa_factory_gw01 |
| GATEWAY PW | d9bbcf85496ddc85e9b1c856de8abfe9e5ab 12632779e0851c43d1639683f791 |
| ACCESS TOKEN | 5a4cd91d-0fa1-4210-a789-e4384696d730 |

REMOTE SYSTEM, REMOTE CONNECTION METHOD AND COMPUTER READABLE STORAGE MEDIUM

CROSS-REFERENCE TO RELATED APPLICATION

The present application is based on PCT filing PCT/JP2021/020333, filed May 28, 2021, the entire contents of which are incorporated herein by reference.

FIELD

The present disclosure relates to a remote system and a remote connection method for externally connecting to a production device in a factory or the like.

BACKGROUND

There is known a system that connects an external terminal that is an information communication device, from an external remote place such as a factory, to a production device such as a programmable logic controller (PLC), a human machine interface (HMI), or an inverter installed in a factory or the like. In such a system, by appropriately setting a network device such as a router or a firewall and switching a global Internet protocol (IP) address or a port number of each production device, remote access from the outside is enabled. Furthermore, by virtually connecting an internal network of the factory and the external network via a local area network (LAN) using a virtual private network (VPN) technology, the production device cannot be accessed from outside.

Patent Literature 1 discloses a control unit capable of easily performing communication setting on a network device in such a system. The control unit described in Patent Literature 1 includes: a storage unit that stores a user program including at least one instruction for settings that are related to communication via a network device; and a communication setting unit that performs transmission and reception of a command to and from the network device based on the fact that an execution condition of instruction is satisfied, and performs communication setting indicated in the instruction. As a result, even a user who does not know how to transmit and receive commands to and from the network device can designate the communication setting and cause the control unit to execute processing according to a designated setting content.

CITATION LIST

Patent Literature

Patent Literature 1: Japanese Patent Application Laid-open No. 2020-088690

SUMMARY

Technical Problem

However, when the technique described in Patent Literature 1 is introduced into an existing factory or the like, there is a problem in that a person having knowledge of a network and information security needs to create a command to perform setting such as introduction of a VPN. In addition, since the technique described in Patent Literature 1 involves a change in setting of the network device in a system, there is a possibility in that a third party intrudes into the system when the setting includes some errors. Therefore, even if the communication setting can be performed on the basis of a command, a person having knowledge of the network and the information security needs to verify whether the setting for the communication setting corresponding to the command is appropriate. There is also a problem in that the number of man-hours for this verification is very large.

The present disclosure has been made in view of the above, and an object of the present disclosure is to provide a remote system that enables to implement remote access to a production device without changing an existing network configuration on a factory and a setting of a network device.

Solution to Problem

In order to solve the above-described problems and achieve the object, in the remote system of the present disclosure, a local area network including a production device and a gateway device is connected via a wide area network to a server device that relays communication between a production device and an external terminal that is an information communication device, and remote connection to the production device by the external terminal is implemented. The remote system includes: a network device that permits connection from an inside to an outside of the local area network and rejects connection from the outside to the inside of the local area network, installed at a connection point of the local area network and the wide area network or between the connection point and the production device. The gateway device includes a server connection control unit that requests the server device to establish a first session between the gateway device and the server device. The server device includes a device management unit and a connection control unit. The device management unit compares device identification information for identifying a target production device designated by the external terminal with device identification information set to the production device. The connection control unit establishes the first session in response to a request for establishment of the first session, establishes a second session between the external terminal and the server device when the device identification information of the target production device matches the device identification information set to the production device as a result of comparison by the device management unit, and links the first session and the second session. The connection control unit of the server device relays communication between the external terminal and the production device, by using the linked first session and second session.

Advantageous Effects of Invention

The remote system according to the present disclosure has an effect of being able to implement remote access to the production device without changing an existing network configuration on the factory and setting of the network device.

BRIEF DESCRIPTION OF DRAWINGS

FIG. 3 illustrates an example of connection device information.

FIG. 4 illustrates an example of connection setting information.

FIG. 5 illustrates an example of device information.

FIG. 6 illustrates an example of gateway information.

FIG. 10 illustrates an example of a connection device selection screen.

FIG. 14 illustrates an example of user information.

FIG. 15 illustrates an example of access control information in a case where access authority is set for each production device.

FIG. 16 illustrates an example of access control information when access authority is set for each gateway device.

FIG. 17 illustrates an example of gateway information.

FIG. 18 illustrates an example of connection setting information.

DESCRIPTION OF EMBODIMENTS

Hereinafter, a remote system and a remote connection method according to an embodiment of the present disclosure will be described in detail with reference to the drawings.

First Embodiment

Figure 1:
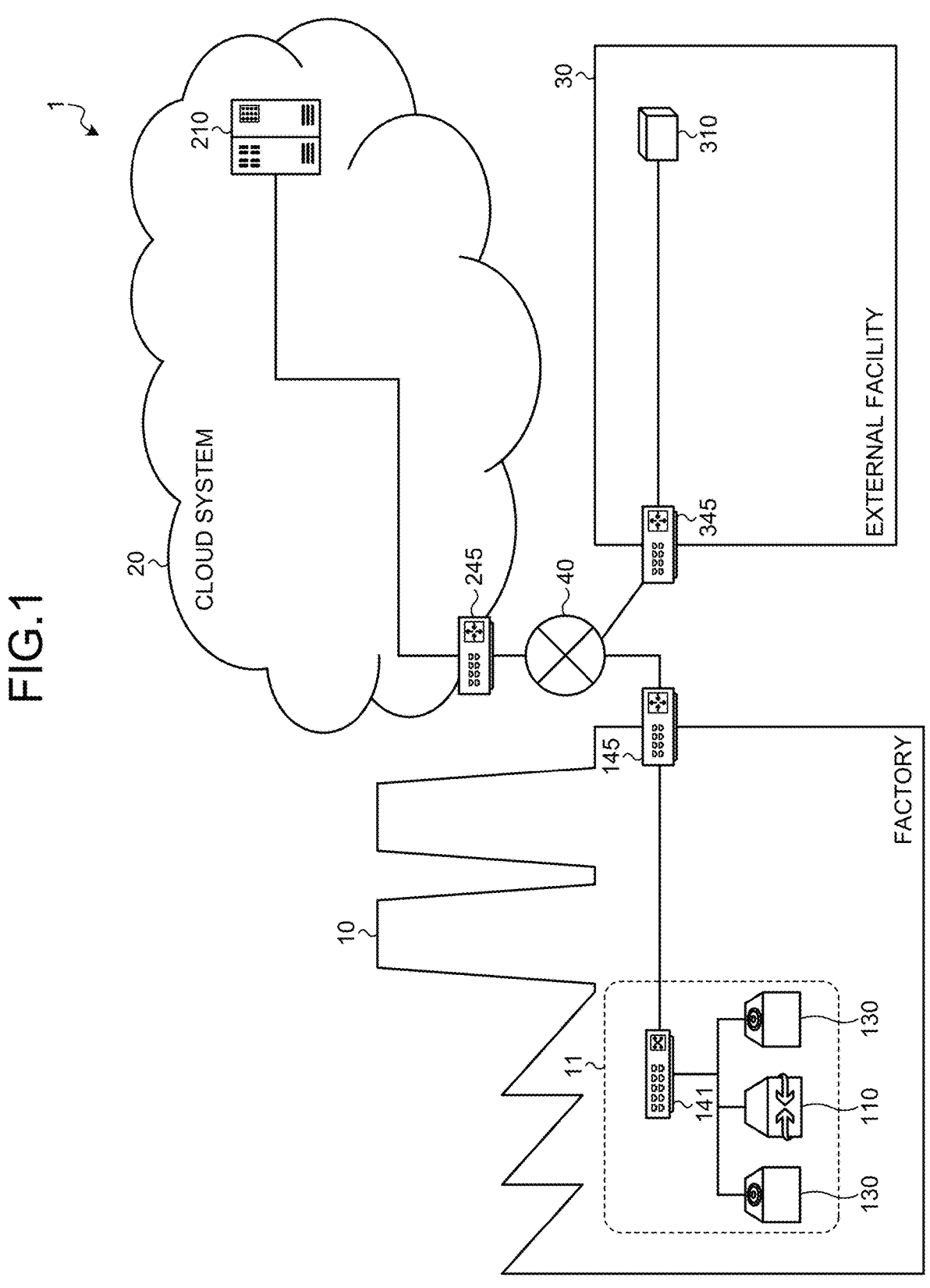
FIG. 1 is a diagram schematically illustrating an example of a configuration of a remote system according to a first embodiment.

FIG. 1 is a diagram schematically illustrating an example of a configuration of a remote system according to a first embodiment. A remote system 1 is a system that implements remote connection to a production device 130 in a factory 10 mainly from the outside of the factory 10, by an external terminal 310 that is an information communication device owned by a user such as an administrator who manages the factory 10. The remote system 1 includes an in-factory network 11 which is a LAN provided in the factory 10, a cloud system 20, and the external terminal 310 provided in an external facility 30. The in-factory network 11, the cloud system 20, and the external terminal 310 are connected via a wide area network 40 such as a public IP network.

The factory 10 includes one or more of the production devices 130. The production device 130 is a device that is used in controlling a control target. An example of the production device 130 is a PLC, an HMI, or an inverter. To the production device 130, a control target device, a sensor for monitoring a state of the control target, and the like are connected. The in-factory network 11 is a network that connects the production devices 130 in the factory 10. The in-factory network 11 includes the production device 130 and a gateway device 110, and the production device 130 and the gateway device 110 are connected by a wired or wireless LAN. In one example, the production device 130 and the gateway device 110 are connected via a switching hub 141. Note that a case is illustrated in which two production devices 130 are connected to the in-factory network 11 in FIG. 1, but one or three or more production devices 130 may be connected.

In the first embodiment, the gateway device 110 searches for the production device 130 connected to the in-factory network 11, and transmits information regarding the production device 130 to a server device 210 of the cloud system 20 when the gateway device 110 finds the production device 130. Further, the gateway device 110 transmits, to the server device 210, a session establishment request for establishing a session that is a first session between the gateway device 110 and the server device 210.

At a connection point between the in-factory network 11 and the wide area network 40, a router 145, which is a network device, is provided. In the first embodiment, setting is made on the router 145 so that connection from the inside of the in-factory network 11 to the outside where the wide area network 40 is provided is permitted; on the other hand, connection from the outside to the inside of the in-factory network 11 is rejected.

In the example of FIG. 1, there is one in-factory network 11 is illustrated; however, a plurality of in-factory networks 11 may be present in one factory 10. For example, each in-factory network 11 including the gateway device 110 is connected to the router 145. Further, although the example of FIG. 1 illustrates a one factory 10, a plurality of factories 10 may be present, and one or more in-factory networks 11 may be provided in each of the factories 10.

The cloud system 20 includes the server device 210. The server device 210 is connected to the wide area network 40 via a router 245 which is a network device. The server device 210 relays communication between the gateway device 110 and the external terminal 310.

The server device 210 stores the information regarding the production device 130 and received from the gateway device 110. When information for identifying the target production device 130 designated by the external terminal 310 is included in the information regarding the production device 130 that is stored in the server device 210, the server device 210 establishes a session that is a second session between the server device 210 and the external terminal 310. Then, the server device 210 links the session between the server device 210 and the external terminal 310 and the session between the server device 210 and the gateway device 110 connected to the target production device 130, to relay communication between the external terminal 310 and the production device 130. Note that, upon receiving a connection request from the external terminal 310, the server device 210 instructs the gateway device 110 to establish a session between the gateway device 110 and the target production device 130. This causes one session to be established between the external terminal 310 and the target production device 130. Note that, although FIG. 1 illustrates the server device 210 of the cloud system 20, an on-premises server device 210 may be adopted.

The external facility 30 is a facility in which a user who performs management, work, and the like of the production device 130 in the factory 10 is present. An example of the external facility 30 is an office that is located physically away from the factory 10, a user's home, or the like. The external terminal 310 is used by the user. The external terminal 310 is, for example, a desktop personal computer (PC), a notebook PC, a smartphone, a tablet terminal, or the like. One or more external terminals 310 are provided. The external terminal 310 is connected to the server device 210 via the wide area network 40 and a router 345, which is a network device. The external terminal 310 transmits a connection request including information regarding the target production device 130 to the server device 210. When the connection request is accepted by the server device 210, connection to the target production device 130 is enabled via the server device 210 and the gateway device 110. Note that the external terminal 310 can be installed in any place as long as the external terminal 310 is in an environment connectable to the wide area network 40. In one example, the external terminal 310 is not limited to be installed in the external facility 30 and can be installed in the factory 10.

FIG. 1 illustrates when one external terminal 310 is provided in the external facility 30, but a plurality of external terminals 310 may be present. In this case, a LAN is configured in the external facility 30 by a switching hub or the like, and the LAN and the router 345 are connected. Further, although FIG. 1 illustrates a case where the network devices are the routers 145, 245, and 345, examples of the network device includes a firewall device, a router device with firewall function, and the like other than the routers 145, 245, and 345.

In applying the remote system 1 according to the first embodiment to the system in which the in-factory network 11 and the external terminal 310 are connected via the wide area network 40, it is not necessary to change the setting of the routers 145, 245, and 345, which are the network devices already installed. That is, the router 145 connected to the in-factory network 11 is normally set to permit connection from the inside to the outside of the in-factory network 11 and not to permit connection from the outside to the inside, and this setting can be used as it is without being changed.

Figure 2:
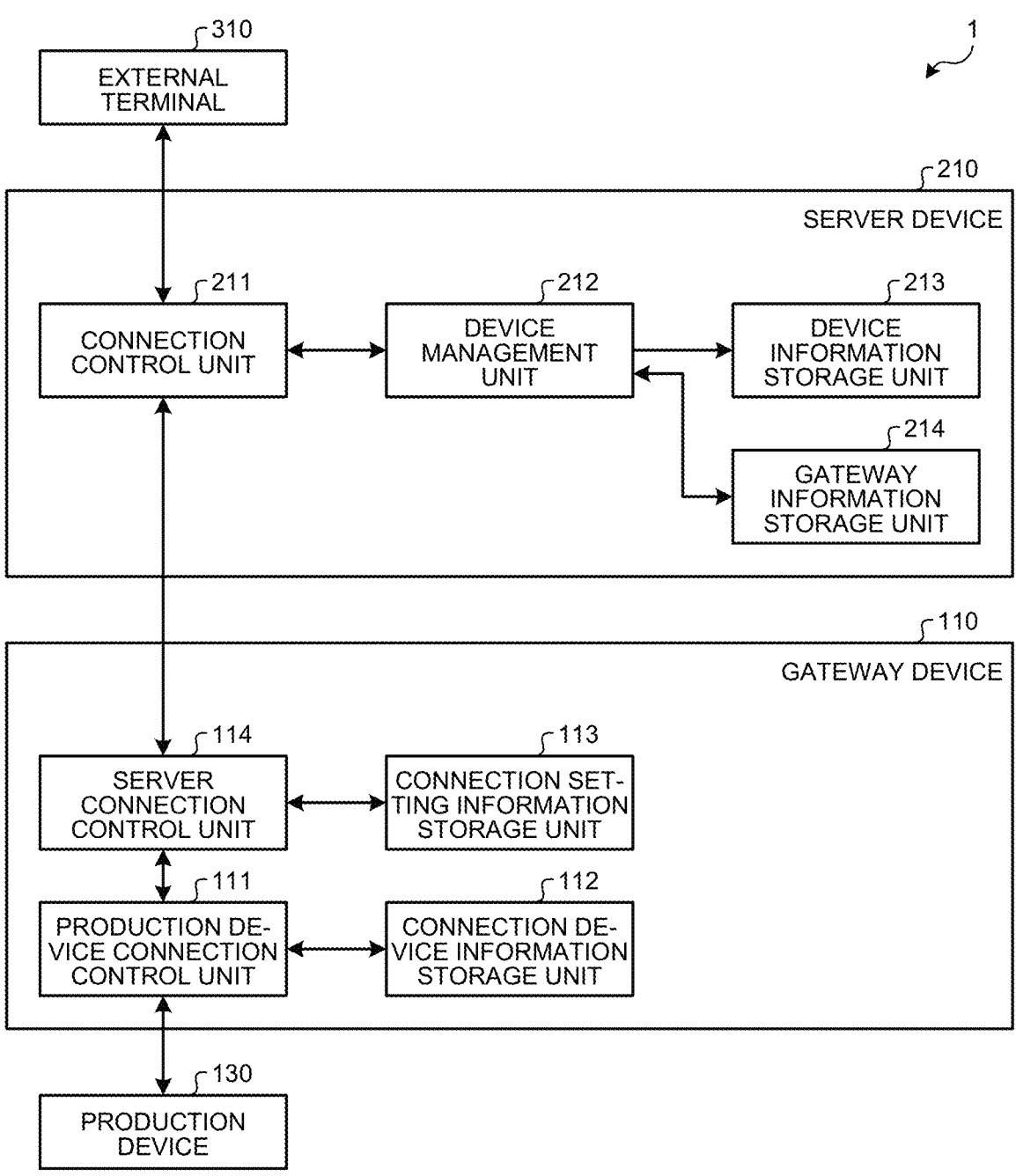
FIG. 2 is a block diagram illustrating an example of a functional configuration of the remote system according to the first embodiment.

FIG. 2 is a block diagram illustrating an example of a functional configuration of the remote system according to the first embodiment. As described above, in the remote system 1 according to the first embodiment, the server device 210 links a session between the gateway device 110 and the server device 210 and a session between the external terminal 310 and the server device 210 to relays communication, thereby establishing connection between the external terminal 310 and the production device. Therefore, FIG. 2 illustrates connection among the external terminal 310, the server device 210, the gateway device 110, and the production device 130. Hereinafter, functional configurations of the gateway device 110 and the server device 210 will be described in detail.

The gateway device 110 includes a production-device-connection-control-unit 111, a connection-device-information-storage-unitdevice-information-storage-unit 112, a connection-setting-information-storage-unit 113, and a server connection control unit 114.

The production-device-connection-control-unit 111 searches for the production device 130 connected to the in-factory network 11 to which the gateway device 110 is connected, that is, the production device 130 to which the gateway device 110 is connectable. When the production-device-connection-control-unit 111 finds the connectable production device 130, the production-device-connection-control-unit 111 acquires information regarding the production device 130 from the connectable production device 130, and registers the information in the device-information-storage-unitconnection-device-information-storage-unit 112. The information regarding the production device 130 includes a physical address, a logical address, a device host name, and a device identifier of the production device 130. The device host name is a name given to the production device 130. The device host name is a host name such as a network basic input output system (NetBIOS) name or a computer name. An example of the device host name is a product type name that is different for each model of products. The device identifier is identification information for uniquely identifying the production device 130 in the remote system 1. The device identifier corresponds to device identification information.

In one example, the production-device-connection-control-unit 111 searches for the connectable production device 130 by using an echo message of Internet Control Message Protocol (ICMP), universal plug and play (UPnP), or other methods. According to these methods, the production-device-connection-control-unit 111 can acquire the physical address, the logical address, the device host name, and the like of the production device 130. Further, the production-device-connection-control-unit 111 can acquire the device identifier, in one example, by transmitting a device-identifier-acquisition-request for requesting the production device 130 to transmit, to the production device 130, a device identifier, and receiving a device-identifier-acquisition-response which is a response to the device-identifier-acquisition-request.

The production-device-connection-control-unit 111 establishes a session between the target production device 130 designated by the server device 210 and the gateway device 110, in accordance with an instruction from the server device 210. This is performed after the external terminal 310 issues a connection request to the server device 210.

The connection-device-information-storage-unitdevice-information-storage-unit 112 stores connection device information, which is information regarding the production device 130 and acquired by the production-device-connection-control-unit 111. The connection device information is information necessary for connection between the gateway device 110 and the production device 130. FIG. 3 illustrates an example of the connection device information. The connection device information is information in which a device media access control (MAC) address, a device IP address, a device host name, and a device identifier are associated with one another. The device MAC address is a physical address of the production device 130. Here, the MAC address is used, but other information may be used as long as a physical address is indicated. The device IP address is a logical address given to the production device 130. In the first embodiment, this field is blank when the device identifier is not registered in the production device 130, since the device identifier is generated by the external terminal 310 and registered in the production device 130, as will be described later.

The connection-setting-information-storage-unit 113 stores connection setting information, which is information necessary for the gateway device 110 to connect to the server device 210. FIG. 4 illustrates an example of the connection setting information. In one example, the connection setting information includes a key-value database in which a setting item that is Key and a setting value that is Value are associated to each other. As setting items, the connection setting information includes: "cloud system server device fully qualified domain name (FQDN)" indicating the server device 210 of the connection target; "gateway identification (ID)" which is information for identifying the gateway device 110; and "gateway password (PW)" which is a password necessary for the gateway device 110 to access the server device 210.

The server connection control unit 114 connects to the server device 210 of the cloud system 20 using the connection setting information in the connection-setting-information-storage-unit 113. When connecting with the server device 210, the server connection control unit 114 uses the gateway ID and the gateway PW to log in to the server device 210 indicated by the "cloud system server device FQDN" in the connection-setting-information-storage-unit 113. Further, when the device identifier is registered in the connection device information, the server connection control unit 114 transmits information regarding the production device 130 corresponding to the registered device identifier, to the server device 210. Moreover, the server connection control unit 114 requests the server device 210 to establish a session between the gateway device 110 and the server device 210.

Note that, in the example of FIG. 2, the connection-device-information-storage-unitdevice-information-storage-unit 112 and the connection-setting-information-storage-unit 113 are provided in the gateway device 110, but may not be provided in the gateway device 110. In this case, a new database device that manages the connection device information and the connection setting information may be provided, and the gateway device 110 may be installed to be able to access the new database device.

The server device 210 includes a connection control unit 211, a device management unit 212, a device-information-storage-unit 213, and a gateway information storage unit 214.

The connection control unit 211 controls connection with the gateway device 110 and connection with the external terminal 310. Specifically, the connection control unit 211 establishes a session between the server device 210 and the gateway device 110 in response to a request from the gateway device 110. Upon receiving a request from the external terminal 310, the connection control unit 211 establishes a session between the server device 210 and the external terminal 310, and establishes a session between the gateway device 110 and the target production device 130 of the external terminal 310. The connection control unit 211 links a session between the server device 210 and the gateway device 110 and a session between the server device 210 and the external terminal 310 to relay communication between the external terminal 310 and the production device 130, when the device identifier of the target production device 130 matches the device identifier set in the production device 130 as a result of comparison by the device management unit 212.

The device management unit 212 registers information regarding the production device 130 from the gateway device 110, into the device-information-storage-unit 213. The information regarding the production device 130 includes a device name, a device identifier, and indication of a gateway to which the production device 130 is connected. The device name is a name given to the production device 130 by the user, and can be freely edited. In addition, the device management unit 212 compares the device identifier for identifying the target production device 130 designated by the external terminal 310 with the device identifier set in the production device 130. In the first embodiment, upon receiving a device connection request from the external terminal 310, the device management unit 212 checks whether the device identifier included in the device connection request is included in the device information in the device-information-storage-unit 213, and outputs a checking result to the connection control unit 211.

The device-information-storage-unit 213 stores device information that is information indicating a network including which gateway device 110 the production device 130 belongs to. It suffices that the device information is information in which the production device 130 is associated with the gateway device 110 of the in-factory network 11 to which the production device 130 belongs. FIG. 5 illustrates an example of the connection device information. The device information includes, as items, a device name, a device identifier, and a gateway ID. The device name is a name given to the production device 130 by the user. The gateway ID is information for identifying the gateway device 110 connected to the in-factory network 11 to which the production device 130 belongs. The gateway ID is a setting value for the "gateway ID" in the connection setting information of FIG. 4.

The gateway information storage unit 214 stores gateway information which is information indicating the gateway device 110 connectable to the server device 210. FIG. 6 illustrates an example of the gateway information. The gateway information is information in which a gateway ID, a gateway PW, and a gateway name are associated with one another. The gateway ID is information for identifying the gateway device 110. In one example, the gateway ID in the device information of FIG. 5 is expressed using the gateway ID. The gateway ID corresponds to the gateway identification information. The gateway name is a name given to the gateway by the user.

Figure 7:
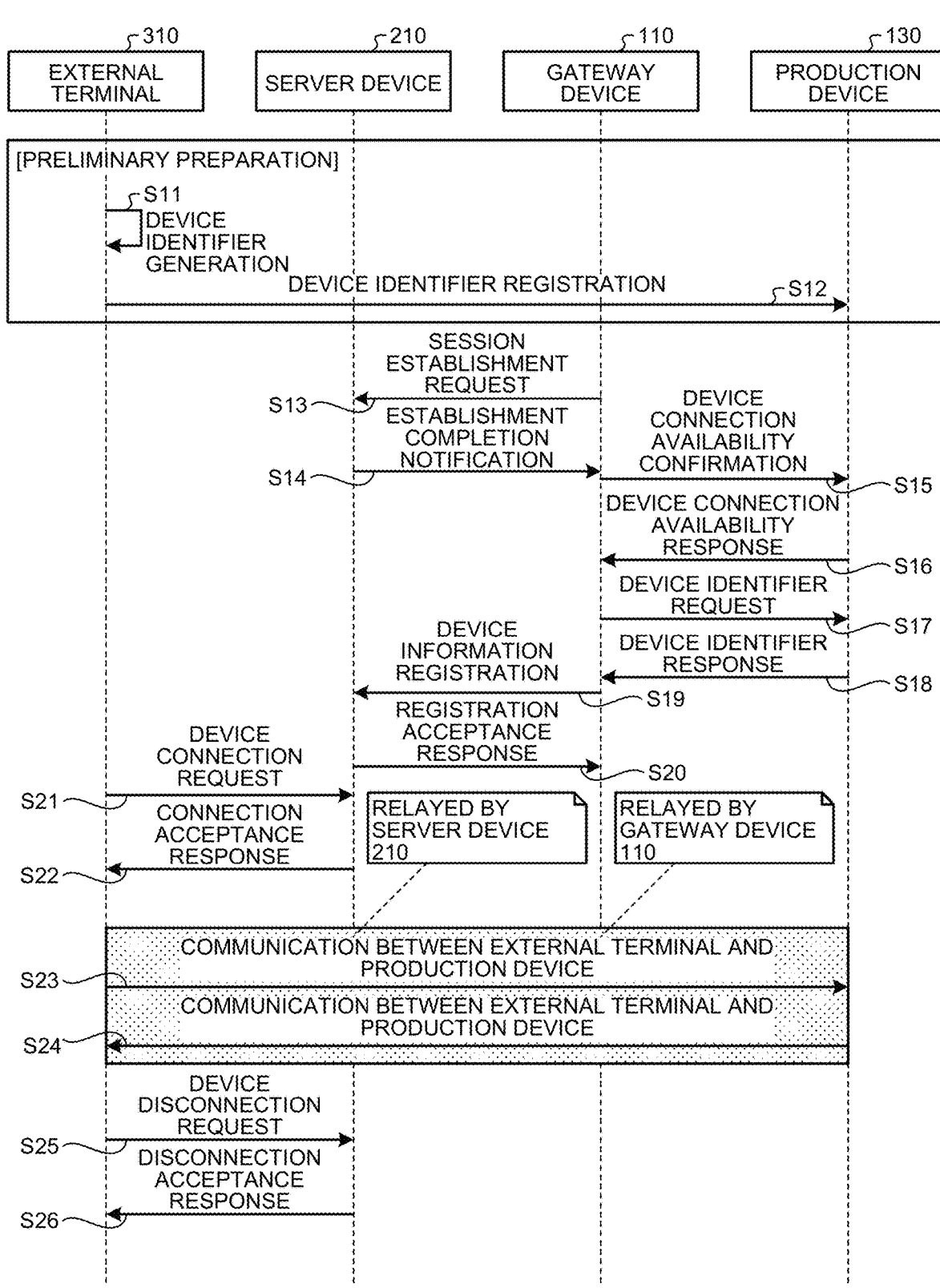
FIG. 7 is a sequence diagram illustrating an example of a procedure of a remote connection method in the remote system according to the first embodiment.

A remote connection method in such the remote system 1 will be described. FIG. 7 is a sequence diagram illustrating an example of a procedure of a remote connection method in the remote system according to the first embodiment. Here, a user who owns the external terminal 310 makes remote access to a certain production device 130 in the factory 10 will be described as an example.

First, preparation is performed. In the preparation, the external terminal 310 generates a device identifier of the target production device 130 to be remotely accessed (step S11). The device identifier is a value that does not overlap in the remote system 1. In one example, the device identifier is generated by a mechanism such as a globally unique identifier (GUID).

Next, the external terminal 310 registers the generated device identifier in the production device 130 (step S12). In one example, the external terminal 310 and the production device 130 are connected by any path such as a universal serial bus (USB) cable, and the device identifier is registered in the production device 130 from the external terminal 310. In addition, the device identifier may be registered in the production device 130 from the external terminal 310 by another method. At this time, the user of the external terminal 310 carries the external terminal 310 to the vicinity of the production device 130 of the factory 10. Thus, the preparation is completed. Thereafter, the user carries the external terminal 310 to the external facility 30.

The server connection control unit 114 of the gateway device 110 transmits a session establishment request to the server device 210 via the wide area network 40 (step S13). Note that, since the connection is from the inside to the outside of the in-factory network 11, the router 145 relays the session establishment request from the gateway device 110 to the server device 210.

The connection control unit 211 of the server device 210 establishes a session between the server device 210 and the gateway device 110. When the session has been successfully established, the connection control unit 211 of the server device 210 responds an establishment completion notification to the gateway device 110 (step S14). Since the establishment completion notification is a response to the session establishment request from the gateway device 110 and is not an access from the outside of the in-factory network 11, the router 145 relays the establishment completion notification to the gateway device 110. This session establishment operation allows the server device 210 and the gateway device 110 to be connected via the network all the time. Thereafter, communication between the server device 210 and the gateway device 110 becomes possible using this session.

The production-device-connection-control-unit 111 of the gateway device 110 transmits a device connection availability confirmation to the production device 130 connectable via a network such as a wired LAN or a wireless LAN (step S15). Searching for the connectable production device 130 may be performed from the gateway device 110 by using an echo message of ICMP which is a general technique, may be performed by using UPnP, or may be performed using other methods.

The production device 130 transmits a device connection availability response to the gateway device 110 (step S16). When the echo message of ICMP is received in step S15, echo reply message is transmitted as the device connection availability response. The production-device-connection-control-unit 111 of the gateway device 110 acquires a MAC address and an IP address of the production device 130 included in the received device connection availability response, and registers the MAC address and IP address in the connection device information of the connection-device-information-storage-unitdevice-information-storage-unit 112. This allows the gateway device 110 to recognize a device connectable to the gateway device 110.

The production-device-connection-control-unit 111 of the gateway device 110 transmits a device identifier request for requesting transmission of a device identifier, to the production device 130 that has sent the device connection availability response (step S17). The production device 130 having the device identifier transmits a device identifier response including the device identifier, to the gateway device 110 (step S18). In one example, the production-device-connection-control-unit 111 of the gateway device 110 acquires a MAC address and a device identifier of a transmission source of the device identifier response, and registers the device identifier in association with the device MAC address in the connection device information.

The server connection control unit 114 of the gateway device 110 transmits device information registration including the device identifier included in the device identifier response, to the server device 210 (step S19). This operation allows the device management unit 212 of the server device 210 to register the device identifier included in the device information registration, in the device information of the device-information-storage-unit 213. At this time, in the device information, a gateway ID of the transmission source gateway device 110 is registered in the gateway ID, and a device name is also registered when there is the device name. Thereafter, the connection control unit 211 of the server device 210 transmits a registration acceptance response to the gateway device 110 (step S20).

Thereafter, when connecting to the production device 130 for which the device identifier is registered in the preparation, the external terminal 310 transmits a device connection request including the device identifier of the target production device 130 to the server device 210 (step S21). The device connection request is a request for establishing a session in the server device 210, and is also a request for connecting to the production device 130 through the session.

Upon receiving the device connection request, the device management unit 212 of the server device 210 acquires the device identifier from the device connection request, and determines whether the acquired device identifier is included in the device information of the device-information-storage-unit 213. That is, the device management unit 212 determines whether the acquired device identifier matches the device identifier included in the device information. When the acquired device identifier does not match the device identifier included in the device information, the device management unit 212 does not permit the device connection request by the external terminal 310. Whereas, when the acquired device identifier matches the device identifier included in the device information, the connection control unit 211 establishes a session between the external terminal 310 and the server device 210. Then, the connection control unit 211 transmits a connection acceptance response to the external terminal 310 (step S22).

At this time, the connection control unit 211 refers to the device information, acquires the gateway device 110 having the gateway ID corresponding to the device identifier, and requests the acquired gateway device 110 to establish a session between the gateway device 110 and the production device 130. This causes establishment of a session between the gateway device 110 and the production device 130.

The server device 210 acquires the gateway ID corresponding to the device identifier included in the device connection request from the device information, and associates a session established between the server device 210 and the gateway device 110 corresponding to the gateway ID, and a session established between the external terminal 310 and the server device 210. In addition, in the gateway device 110, a session between the gateway device 110 and the production device 130 is associated with a session between the gateway device 110 and the server device 210. This causes establishment of a session from the external terminal 310 to the production device 130. That is, the production device 130 and the external terminal 310 are in a communicable state.

In this state, in communicating from the external terminal 310 to the production device 130, the external terminal 310 transmits any data to the server device 210. At this time, the server device 210 and the gateway device 110 relay any data by using the established session, and any data is sent to the production device 130 (step S23).

Similarly, in communicating from the production device 130 to the external terminal 310, the production device 130 transmits any data to the gateway device 110. At this time, the gateway device 110 and the server device 210 relay any data by using the established session, and any data is transmitted to the external terminal 310 (step S24).

When the external terminal 310 disconnects the communication with the production device 130, the external terminal 310 transmits a device disconnection request to the server device 210 (step S25). Upon receiving the device disconnection request from the external terminal 310, the connection control unit 211 of the server device 210 transmits a disconnection acceptance response to the external terminal 310 (step S26). At this time, communication between the external terminal 310 and the production device 130 is shut off.

Figure 8:
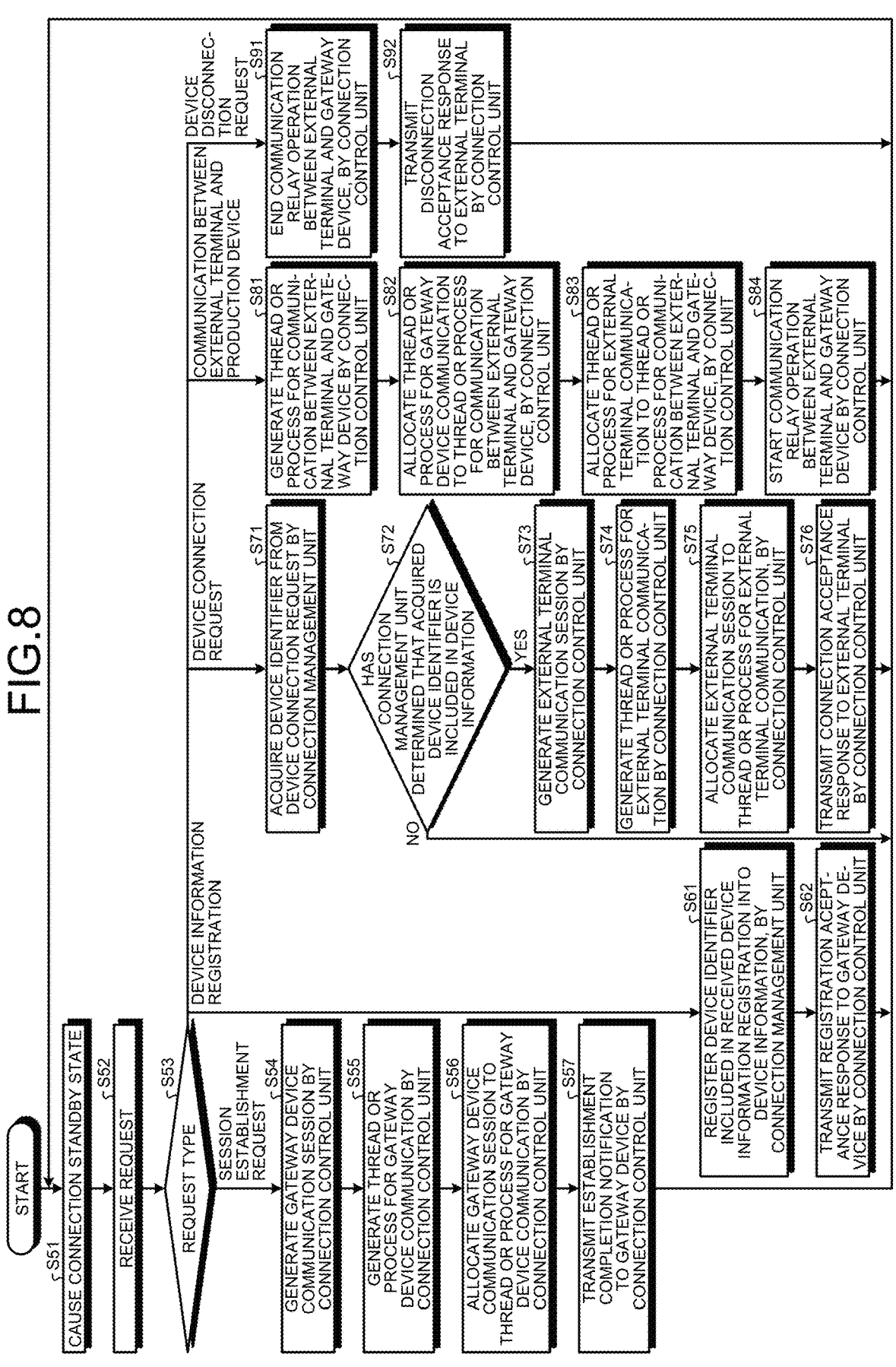
FIG. 8 is a flowchart illustrating an example of an operation of a server device included in the remote system according to the first embodiment.

FIG. 8 is a flowchart illustrating an example of an operation of the server device included in the remote system according to the first embodiment. It is assumed that the connection control unit 211 is in a connection standby state (step S51). In this state, upon receiving a request from the gateway device 110 or the external terminal 310 (step S52), the connection control unit 211 determines a type of the request (step S53).

When the request is a session establishment request from the gateway device 110 (in a case of a session establishment request in step S53), the connection control unit 211 generates a gateway device communication session (step S54). In addition, the connection control unit 211 generates a thread or a process for gateway device communication (step S55).

Next, the connection control unit 211 allocates the gateway device communication session to the thread or the process for gateway device communication (step S56). Then, the connection control unit 211 transmits the establishment completion notification to the gateway device 110 (step S57), and the processing returns to step S51.

When the request is device information registration from the gateway device 110 (in a case of device information registration in step S53), the device management unit 212 registers the device identifier included in the received device information registration into the device information (step S61). Thereafter, the connection control unit 211 transmits a registration acceptance response to the gateway device 110 (step S62), and the processing returns to step S51.

When the request is a device connection request from the external terminal 310 (in a case of a device connection request in step S53), the device management unit 212 acquires the device identifier from the device connection request (step S71), and determines whether the acquired device identifier is included in the device information (step S72). When the device identifier is not included in the device information (No in step S72), the device connection request is determined to be invalid. Then, the processing returns to step S51.

Further, when the device identifier is included in the device information (Yes in step S72), the connection control unit 211 generates an external terminal communication session (step S73). Furthermore, the connection control unit 211 generates a thread or a process for external terminal communication (step S74).

Next, the connection control unit 211 allocates the external terminal communication session to the thread or the process for external terminal communication (step S75). Thereafter, the connection control unit 211 transmits a connection acceptance response to the external terminal 310 (step S76), and the processing returns to step S51.

When the request is for communication between the external terminal 310 and the production device 130 (in a case of communication between the external terminal and the production device in step S53), the connection control unit 211 generates a thread or a process for communication between the external terminal 310 and the gateway device 110 (step S81). Next, the connection control unit 211 allocates the thread or the process for gateway device communication to the thread or the process for communication between the external terminal 310 and the gateway device 110 (step S82).

Furthermore, the connection control unit 211 allocates the thread or the process for external terminal communication, to the thread or the process for communication between the external terminal 310 and the gateway device 110 (step S83). As a result, the session between the external terminal 310 and the server device 210 is connected to the session between the server device 210 and the gateway device 110. Thereafter, the connection control unit 211 starts a communication relay operation between the external terminal 310 and the gateway device 110 (step S84). Then, the processing returns to step S51. In this manner, the gateway device 110 refers to the established session and the connection-device-information-storage-unit 112, determines the production device 130 which is a connection target and relays data.

When the request is a device disconnection request (in a case of a device disconnection request in step S53), the connection control unit 211 ends the communication relay operation between the external terminal 310 and the gateway device 110 (step S91). Thereafter, the connection control unit 211 transmits a disconnection acceptance response to the external terminal 310 (step S92), and the processing returns to step S51.

Here, when a session establishment request is issued from the server device 210 to the gateway device 110 not from the gateway device 110 to the server device 210, the network device does not allow the session establishment request to reach the gateway device 110. Further, in order to enable the server device 210 to issue the session establishment request to the gateway device 110, it is necessary to perform setting to permit the network device to access the inside of the in-factory network 11 from the outside. In this case, the network device can access the in-factory network 11 by the external terminal 310 owned by a third party, and security can no longer be maintained.

In the remote system 1 according to the first embodiment, the in-factory network 11 that includes the production device 130 and the gateway device 110, the server device 210, and the external terminal 310 are connected via the wide area network 40, and the in-factory network 11 is connected to the wide area network 40 via the network device that relays connection from the inside to the outside and shuts off connection from the outside to the inside. The gateway device 110 issues a session establishment request to the server device 210 to establish a session between the gateway device 110 and the server device 210. The server device 210 holds device information including device identification information of the production device 130 the device identification information of which is registered. The server device 210 is adapted to check whether the device identification information included in a device connection request is included in the device information when the server device 210 receives the device connection request from the external terminal 310. When the device identification information is included in the device information, the server device 210 is adopted to establish a session between the server device 210 and the external terminal 310, and further link the session between the server device 210 and the external terminal 310 and the session between the server device 210 and the gateway device 110 connected to the target production device 130. As a result, it is possible to implement remote access from the external terminal 310 to the production device 130 without requiring a change in configuration of the existing in-factory network 11 in the factory 10 and in setting of the network device such as the router 145. Further, since setting change of the network device is unnecessary, it is possible to reduce the number of setting man-hours for communication setting and the number of verification man-hours for verification work for the communication setting by a person having knowledge of the network and information security, and to reduce or prevent setting errors.

More specifically, in initial setting of most commercially available network devices, connection from an inside to an outside of a network is permitted, and conversely, connection from the outside to the inside of the network is rejected from the viewpoint of information security. In conventional techniques such as Patent Literature 1, initial setting for rejecting connection from the outside to the inside has been changed in order to implement existing remote access in the network device.

Whereas, in the remote system 1 according to the first embodiment, a session establishment request is made from the gateway device 110 inside the factory 10 to the server device 210 outside the factory 10. That is, it is not necessary to change the initial setting of the network device. Furthermore, from the viewpoint of information security, setting for accepting connection from the outside is not performed on the router 145 on the factory 10 side. Therefore, without special setting of the network device, it becomes possible to easily prevent access of an external terminal owned by a third party to the production device 130 while relaying communication between the external terminal 310 owned by the user and the production device 130.

Further, in the first embodiment, communication between the external terminal 310 and the production device 130 is performed by socket communication with transmission control protocol/Internet protocol (TCP/IP) or the like, that is, communication using a session. Therefore, it is possible to support any communication standard compatible with IP and to implement remote access to devices other than the PLC.

In the first embodiment, the external terminal 310, the server device 210 of the cloud system 20, and the production device 130 have a device identifier for uniquely identifying the production device 130. When the external terminal 310 is connected to the production device 130, the server device 210 compares the device identifiers of the external terminal 310 and the production device 130 and then relays communication between the both sides, to implement remote access. This enables remote access to be easily performed between the external terminal 310 and the production device 130 without inputting connection destination information such as an IP address or a port number. That is, the user can perform remote access without managing network information including the IP address and the port number.

By using the device identifier, the external terminal 310 can be connected without selecting a target from a plurality of production devices 130. Connection is not permitted to the external terminal 310 that has made a device connection request including a device identifier not registered in the server device 210, so that it is possible to prevent access to the production device 130 of the in-factory network 11 by a third party who does not know the device identifier. As described above, in the remote system 1 according to the first embodiment, even a user who does not have knowledge of information security can implement remote access safely and easily without changing setting of an existing network device.

Conventionally, a technique is known in which a session is established between a production device in a factory and a data center by WebSocket communication, and a mobile terminal remotely accesses the production device in the factory via the data center. In this technique, the production device has a function of establishing a session as a precondition, and remote access cannot be made to the production device that does not have the function of establishing a session. However, in the first embodiment, since the gateway device 110 not the production device 130 establishes a session, the production device 130 may not have the function of establishing a session. That is, in order to establish a session between the server device 210 and the gateway device 110 and perform any communication with the production device 130 through the gateway device 110, remote access can be performed even in the production device 130 having no mechanism for establishing a session.

Second Embodiment

In the first embodiment, the external terminal 310 has generated a device identifier, and registered the device identifier in the production device 130. In a second embodiment, a case where the production device 130 has a function of generating a device identifier will be described.

Since a configuration of the remote system 1 according to the second embodiment is similar to that described in the first embodiment, the description thereof will be omitted. However, the production device 130 has a function of generating a device identifier. In addition, the connection control unit 211 of the server device 210 has a function of displaying device information in the device-information-storage-unit 213 in a form of a list on the external terminal 310, in accordance with a request from the external terminal 310.

Figure 9:
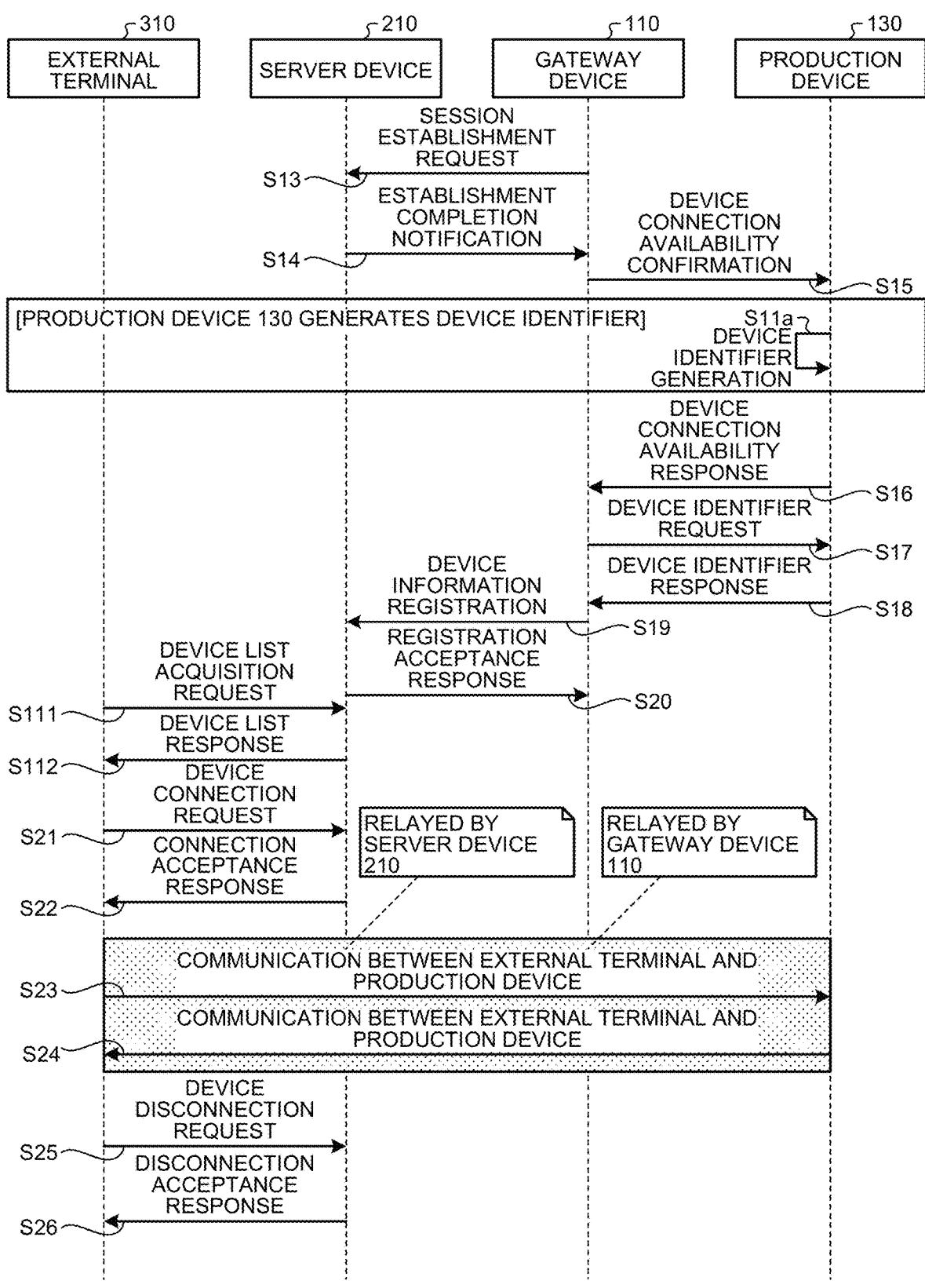
FIG. 9 is a sequence diagram illustrating an example of a procedure of a remote connection method in a remote system according to a second embodiment.

FIG. 9 is a sequence diagram illustrating an example of a procedure of a remote connection method in the remote system according to the second embodiment. Note that, hereinafter, parts identical to those in FIG. 7 of the first embodiment will not be described, and different parts will be described. In addition, here, it is assumed that no device identifier is written in the production device 130.

In the second embodiment, the production device 130 has a function of generating a device identifier, so that generation of a device identifier by the external terminal 310 and registration of the device identifier in the production device 130 in steps S11 to S12 in FIG. 7 are not performed.

Upon receiving a device connection availability confirmation by the gateway device 110 in step S15, the production device 130 generates a device identifier when the device identifier is not written in the internal storage unit (step S11*a*). The generated device identifier is written in a storage unit inside the production device 130. Thereafter, the production device 130 transmits a device connection availability response to the gateway device 110 (step S16).

Note that, here, the generation of the device identifier in step S11*a* is performed after the device connection availability confirmation in step S15 is received, but may be after the device connection availability response in step S16 is transmitted or after the device identifier request in step S17 is received.

Further, the gateway device 110 registers the connection device information for the production device 130 after receiving the device connection availability response in step S16 and receiving the device identifier response in step S18, but the device name of the production device 130 may not be registered at this point. In this case, information on the production device 130 is registered in the device information on the server device 210 while the device name is not registered.

In the first embodiment, the external terminal 310 has transmitted the device connection request including the device identifier to the server device 210. However, in the second embodiment, the external terminal 310 does not have information on the device identifier of the production device 130. Therefore, the external terminal 310 transmits a device list acquisition request to the server device 210 before the device connection request in step S21 (step S111). Upon receiving the device list acquisition request, the connection control unit 211 of the server device 210 transmits a device list response including the connection device information, which is information regarding the production device 130 connectable to the external terminal 310 and has been extracted from the device information of the device-infor-mation-storage-unit 213, to the external terminal 310 (step S112).

The external terminal 310 displays a connection device selection screen on the display unit by using the connection device information included in the device list response. FIG. 10 illustrates an example of the connection device selection screen. A connection device selection screen 500 includes a device list display area 510 and a connection button 520.

In the device list display area 510, device list information, which is information that can specify the production device 130 in the connection device information, is displayed. In one example, the device list information is list data including a device name, a device host name, and a gateway name as items. The device name, the device host name, and the gateway name are similar to those described above. A combination of the device name, the device host name, and the gateway name in the device list information is referred to as a record 511. In the device list information illustrated in FIG. 10, the user of the external terminal 310 can select any record 511. Note that the connection device information includes a device identifier associated with the record 511 of the device list information, in addition to information indi-cated in the device list information.

The connection button 520 is a button for transmitting, to the server device 210, a device connection request of the record 511 selected in the device list information to the production device 130. At this time, a device identifier corresponding to the selected record 511 is extracted from the connection device information, and the device connec-tion request includes the extracted device identifier.

Returning to FIG. 9, when the user of the external terminal 310 presses the connection button 520 while select-ing one record 511 in the device list information, the device connection request in step S21 is executed. Here, the device identifier included in the device connection request has been selected from the device list response including the connec-tion device information transmitted from the server device 210 to the external terminal 310. Therefore, when the device management unit 212 of the server device 210 receives the device connection request, a process similar to the process of collating the device identifier for identifying the target production device 130 designated by the external terminal 310 with the device identifier set in the production device 130 is performed. Thereafter, the processing is similar to that in FIG. 7.

Note that, in FIG. 10, there are a plurality of records 511 having an identical device host name and gateway name and having an unset device name. When the production device 130 of one record is selected and connected, the user who uses the external terminal 310 does not know to which one of the production devices 130 at the site the external terminal 310 is connected. Therefore, in the second embodiment, an environment is provided in which the user can grasp whether connection to the target production device 130 has been established.

An example of a method of grasping whether connection to the target production device 130 has been established via remote communication is checking actual machine informa-tion, which is information on a device constituting the production device 130, by using an engineering tool intro-duced into the external terminal 310. An example of the actual machine information is a combination of a model name and manufacturing information of the production device 130. That is, the engineering tool of the external terminal 310 reads configuration information including the model name and the manufacturing information of the production device 130, and outputs the configuration infor-mation to the display unit (not illustrated). The engineering tool is an application for setting the production device 130 on the basis of an input from a user. By comparing actual machine information held by the user and regarding the target production device 130 with the actual machine infor-mation acquired by the engineering tool, the user can check whether or not connection to the target production device 130 has been established.

Another example of the method of grasping whether connection to the target production device 130 has been established via remote communication is checking project information read from the production device 130 by using an engineering tool introduced into the external terminal 310. The project information is information for controlling the production device 130. The project information includes a program executed by the production device 130, a parameter used when the production device 130 executes the program, a label that is a variable whose value changes according to a state of each device controlled by the production device 130, and the like. That is, the engineering tool of the external terminal 310 reads project information including the pro-gram, the parameter, and the label, and outputs the project information to a display unit (not illustrated). By comparing a program, a parameter, a label, and the like involved in creating, with the program, the parameter, the label, and the like acquired by the engineering tool, the user can check whether or not connection to the target production device 130 has been established.

Figure 11:
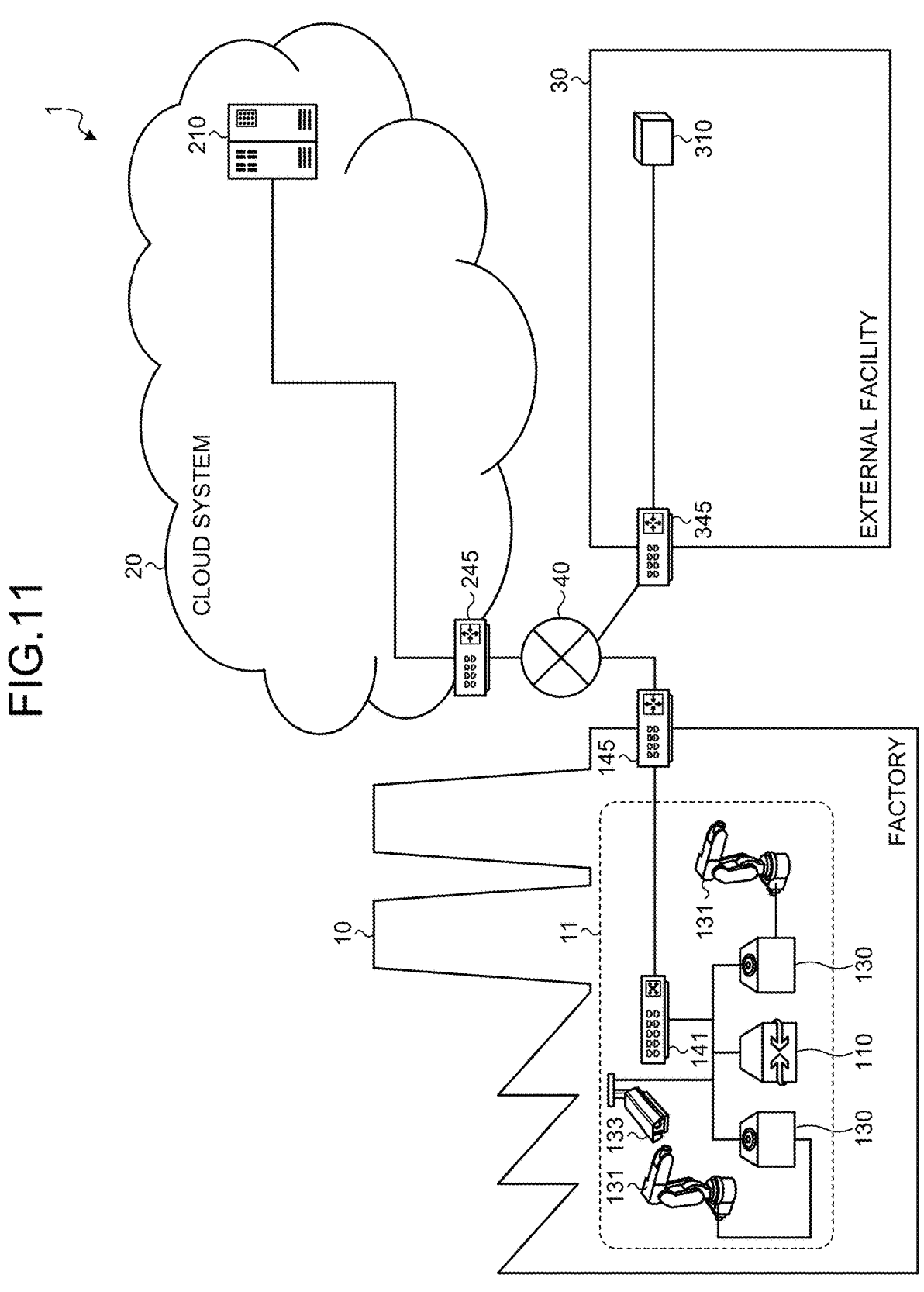
FIG. 11 is a diagram illustrating an example of a configuration of the remote system according to the second embodiment.

Another example of the method of grasping whether connection to the target production device 130 has been established via remote communication is checking an opera-tion of a control target controlled by the production device 130 using a camera installed in the factory 10 to make a decision. FIG. 11 is a diagram illustrating an example of a configuration of a remote system according to the second embodiment. Note that components identical to those in FIG. 1 are denoted by the identical reference numerals, and the description thereof will be omitted. The remote system 1 of FIG. 11 further includes a robot arm 131 that is a control target connected to each of the two production devices 130, and a camera 133 capable of imaging the robot arms 131. One camera 133 may be arranged at a position where two robot arms 131 can be imaged simultaneously, or two cameras 133 may be installed and each arranged at a position where a region including corresponding one of the robot arms 131 can be imaged. Furthermore, the camera 133 is connected to the in-factory network 11, and connectable to the external terminal 310. The external terminal 310 has a function of causing execution of a program of the production device 130 selected from a list, and displaying an image imaged by the camera 133 and including the operation of the robot arm 131 of the selected production device 130 on a display unit (not illustrated).

In one example, the user of the external terminal 310 edits and executes a program for controlling the robot arm 131 online, by using an engineering tool introduced into the external terminal 310. Then, depending on whether or not the operation of the robot arm 131 imaged by the camera 133 is operating in accordance with the edited program, the user can check whether or not the connection to the target production device 130 has been established.

In the case of the three examples described above, when the external terminal 310 is not connected to the target production device 130, the external terminal 310 may simply transmit a device disconnection request to the server device 210 and execute the processing of step S111 and the subsequent steps. Note that the method illustrated here is an example, and whether or not the connection to the target production device 130 has been established may be grasped by another method.

In the second embodiment, the production device 130 generates a device identifier. Therefore, as compared with the case of the first embodiment, it is possible to obtain an effect of being able to omit the preparation performed by the user carrying the external terminal 310 to a target production facility of the factory 10, in addition to the effect of the first embodiment.

Further, the first embodiment and the second embodiment may be combined. That is, the in-factory network 11 may include: the production device 130 that can generate a device identifier by itself; and the production device 130 in which a device identifier is written in the preparation. In this case, the connection device information regarding: the production device 130 in which a device identifier is written in the preparation as in the first embodiment; and the production device 130 that generates a device identifier by itself as in the second embodiment, is included in the device list response and transmitted to the external terminal 310. Since the record 511 of the production device 130 in which the device identifier is written is displayed on the connection device selection screen 500, the user of the external terminal 310 can select the production device 130 desired to be accessed from the connection device selection screen 500.

Third Embodiment

In the second embodiment, the case where the production device 130 has the function of generating the device identifier has been described as an example. However, the number of production devices 130 is large, and updating the production device 130 having the function of generating the device identifier may be difficult in terms of cost and work. Therefore, in a third embodiment, the remote system 1 including the production device 130 that does not support generation and registration of a device identifier will be described.

Since a configuration of the remote system 1 according to the third embodiment is similar to that described in the first embodiment, the description thereof will be omitted. However, the production-device-connection-control-unit 111 of the gateway device 110 further has a function of generating a device identifier of the production device 130 connected to the in-factory network 11 and registering the device identifier in the connection device information. Further, the production device 130 does not have a function of transmitting the device identifier to the gateway device 110.

Figure 12:
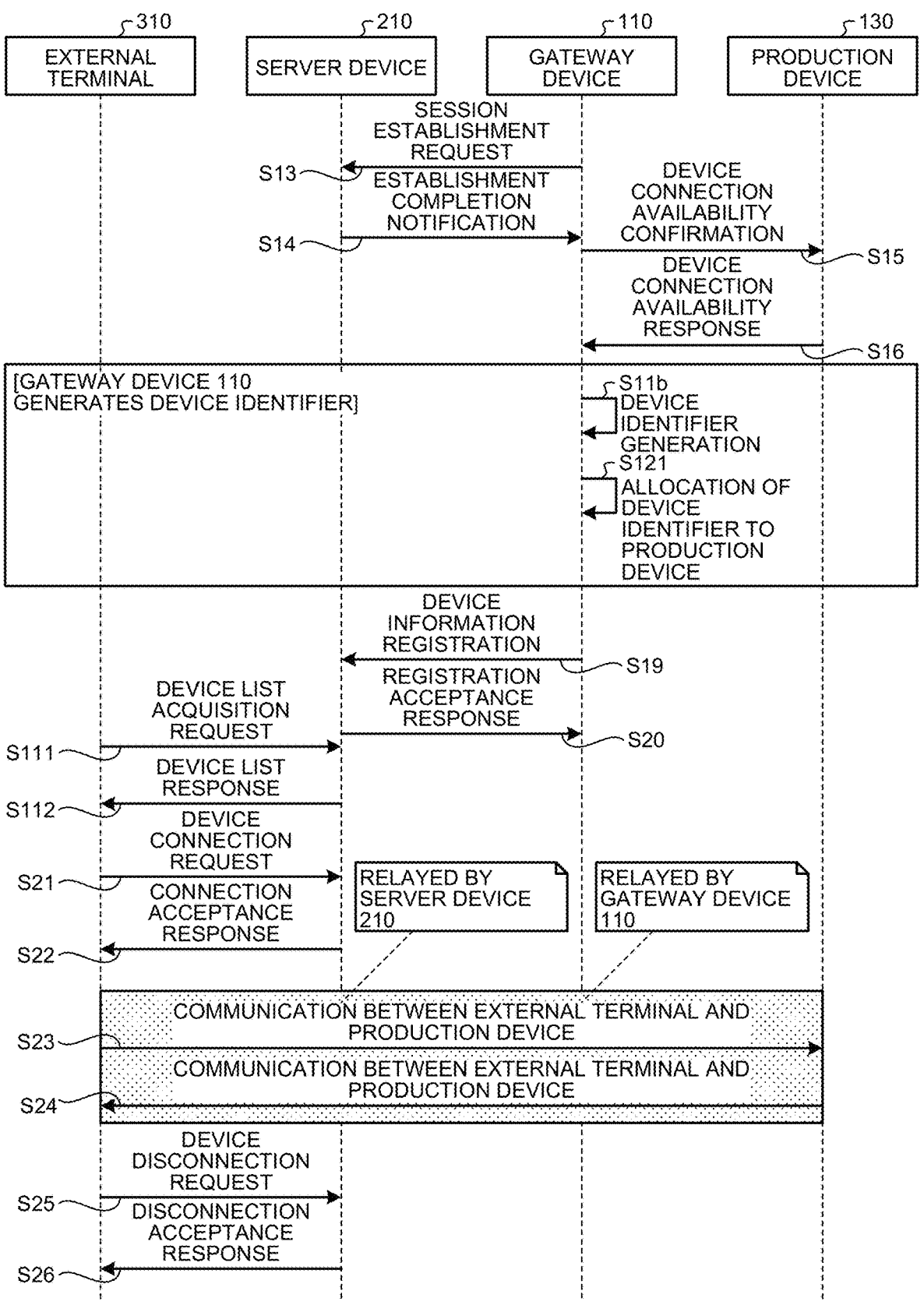
FIG. 12 is a sequence diagram illustrating an example of a procedure of a remote connection method in a remote system according to a third embodiment.

FIG. 12 is a sequence diagram illustrating an example of a procedure of a remote connection method in the remote system according to the third embodiment. Note that, hereinafter, parts identical to those in FIG. 7 of the first embodiment FIG. 9 of the second embodiment will not be described, and different parts will be described.

In the third embodiment, since the production device 130 does not have a device identifier, the production device 130 does not support a communication scheme using the device identifier. Specifically, the processing in which the gateway device 110 transmits the device identifier request to the production device 130 in step S17 in FIGS. 7 and 9, and the processing in which the production device 130 returns the device identifier response to the gateway device 110 in step S18 are not performed.

Therefore, after receiving the device connection availability response from the production device 130 in step S16, the production-device-connection-control-unit 111 of the gateway device 110 generates a device identifier for the production device 130 that does not have a device identifier in the connection device information of the connection-device-information-storage-unit 112 (step S11b). Further, the production-device-connection-control-unit 111 of the gateway device 110 allocates the generated device identifier to the production device 130 in the connection device information (step S121).

When the device identifier is generated, the processing of step S19 and the subsequent steps of registering the generated device identifier in the server device 210 is performed.

In the third embodiment, the gateway device 110 generates and manages the device identifier of the production device 130. Therefore, even when the production device 130 does not support generation and registration of a device identifier, remote access from the external terminal 310 to the production device 130 is enabled, and effects similar to those of the first and second embodiments can be obtained.

Further, the first to third embodiments may be combined. In this case, the in-factory network 11 may include: the production device 130 in which a device identifier is written in the preparation as in the first embodiment; the production device 130 that generates a device identifier by itself as in the second embodiment; and the production device 130 that does not support generation and transmission of the device identifier as in the third embodiment in which the gateway device 110 generates and manages the device identifier. In this case, the connection device information on these production devices 130 is included in the device list response, and transmitted to the external terminal 310. Since the record 511 of the production device 130 in which the device identifier is written is displayed on the connection device selection screen 500, the user of the external terminal 310 can select the production device 130 desired to be accessed from the connection device selection screen 500.

Fourth Embodiment

In the second and third embodiments, a case has been described in which the device list response is returned to the external terminal 310 that has transmitted the device list acquisition request to the server device 210. Normally, only the external terminal 310 owned by a person involved in the factory 10 can be connected to the server device 210, but the external terminal 310 of a third party may attempt to connect to the server device 210. In this case, the third party can access the production device 130. In a fourth embodiment, a technique for preventing access to the production device 130 from the external terminal 310 of a third party that can be connected to the server device 210 will be described.

Figure 13:
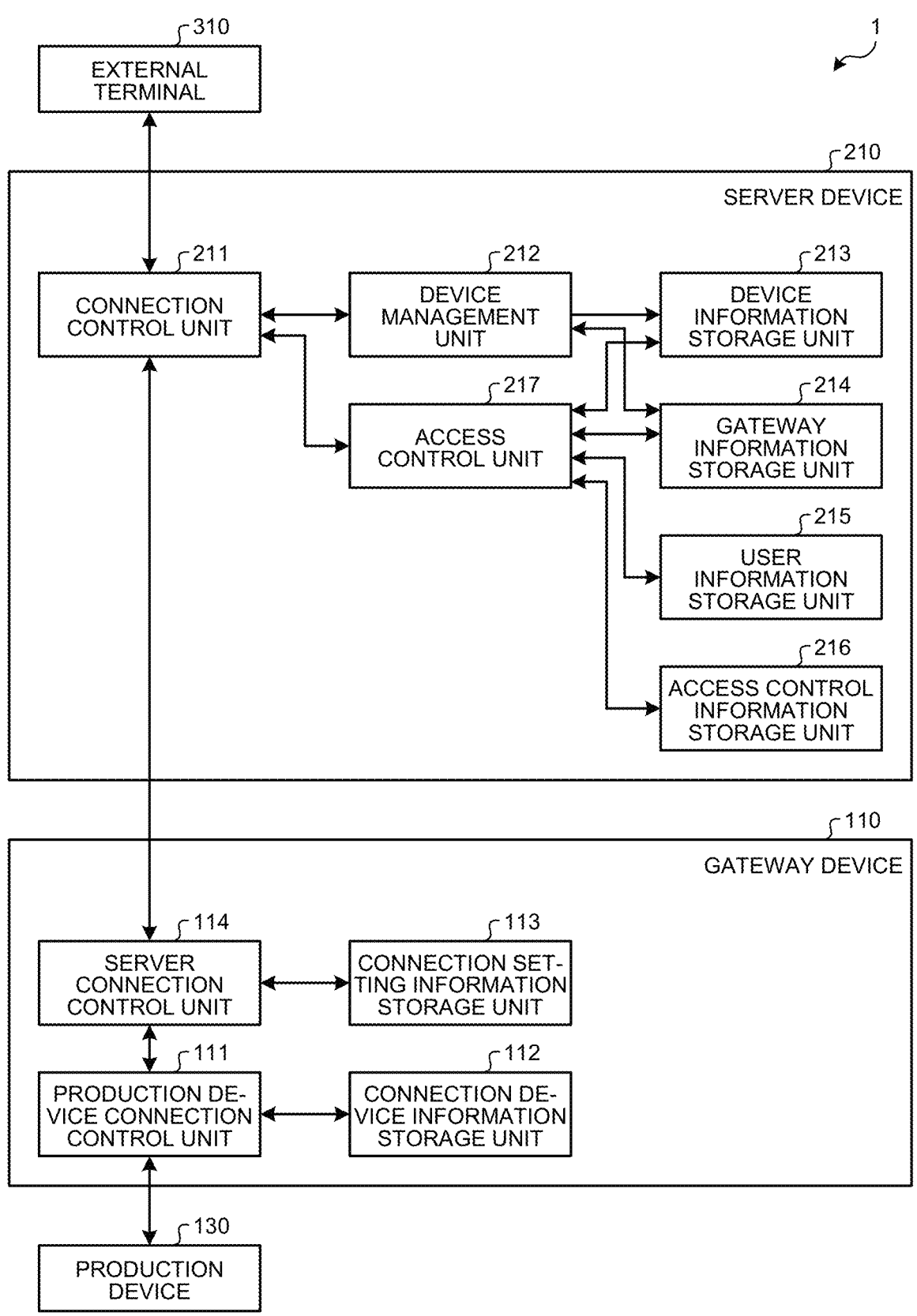
FIG. 13 is a diagram illustrating an example of a functional configuration of a remote system according to a fourth embodiment.

Since a configuration of the remote system 1 according to the fourth embodiment is similar to that described in the first embodiment, the description thereof will be omitted. FIG. 13 is a diagram illustrating an example of a functional configuration of a remote system according to the fourth embodiment. Note that components identical to those in FIG. 2 of the first embodiment are denoted by the identical reference numerals, and the description thereof will be omitted.

In the remote system 1 according to the fourth embodiment, a configuration of the server device 210 is different from those of the first to third embodiments. The server device 210 further includes a user information storage unit 215, an access control information storage unit 216, and an access control unit 217.

The user information storage unit 215 stores user information, which is information regarding a user who has the external terminal 310. FIG. 14 illustrates an example of the user information. The user information is information in which a user ID, a user PW, a user name, and an access token are associated with one another. The user ID is identification information for identifying the user. The user PW is a password set for the user ID. The user name is a name given to the user having the user ID. The access token is authentication information issued to the user authenticated as the user.

The access control information storage unit 216 stores access control information, which is information defining access authority of the user to access the production device 130. The access control information can be set for each production device 130 and each gateway device 110.

FIG. 15 illustrates an example of the access control information in a case where access authority is set for each production device. The access control information includes, as items, a user ID, an access authority, and a device identifier. The access control information is information in which the user ID, the access authority, and the device identifier are associated with one another. For the access authority, "permitted" is set when access is possible, and "rejected" is set when access is not possible. In the access control information, whether to permit or reject the user registered in the user ID to access the production device 130 indicated by the device identifier is set.

FIG. 16 illustrates an example of the access control information when access authority is set for each gateway device. The access control information includes, as items, a user ID, an access authority, and a gateway ID. The access control information is information in which the user ID, the access authority, and the gateway ID are associated with one another. In the access control information, whether to permit or reject the user registered in the user ID to access the gateway device 110 indicated by the gateway ID is set.

Note that, when user's access to the production device 130 is set to be rejected by default, the item of the access authority in FIGS. 15 and 16 can be made unnecessary. In this case, a combination of the user ID permitted to access and the device identifier of the production device 130 or the gateway ID of the gateway device 110 is registered in the access control information.

The access control information storage unit 216 holds two pieces of information, that is, the access control information in which access authority is set for each production device 130 and the access control information in which access authority is set for each gateway device 110. A priority order of the access control information in which access authority is set for each production device 130 is higher than that of the access control information in which access authority is set for each gateway device 110. That is, basically, the access authority is set in the access control information in which access authority is set for each gateway device 110, and detailed control is set in the access control information in which access authority is set for each production device 130.

The access control unit 217 authenticates the gateway device 110 with reference to gateway information, and authenticates the user of the external terminal 310 with reference to user information. Specifically, when the access control unit 217 receives, from the gateway device 110, a gateway authentication request including gateway authentication information which is information for authenticating the gateway device 110, the access control unit 217 compares the gateway information with the gateway authentication information included in the gateway authentication request. As a result of collation, when the gateway authentication information is registered in the gateway information, that is, when the gateway device 110 is the authorized gateway device 110, the access control unit 217 issues an access token. Then, the connection control unit 211 allows establishment of a session between the server device 210 and the gateway device 110. Whereas, if the gateway authentication information is not registered in the gateway information as a result of collation, that is, when the gateway device 110 is not the authorized gateway device 110, the connection from the gateway device 110 is not accepted. An example of the gateway authentication information is a gateway ID and a gateway PW.

Further, when the access control unit 217 receives, from the external terminal 310, a user authentication request including user authentication information which is information for authenticating the user, the access control unit 217 compares the user information with the user authentication information included in the user authentication request. As a result of collation, when the user authentication information is registered in the user information, that is, when the user is an authorized user, the access control unit 217 issues an access token. Then, the connection control unit 211 allows the external terminal 310 used by the user to access the production device 130. Whereas, if the user authentication information is not registered in the user information as a result of collation, that is, when the user is not an authorized user, connection from the external terminal 310 is not accepted. An example of the user authentication information is a user ID and a user PW.

In the fourth embodiment, the gateway information in the gateway information storage unit 214 of the server device 210 and the connection setting information in the connection-setting-information-storage-unit 113 of the gateway device 110 are different from those described in the first embodiment.

FIG. 17 illustrates an example of the gateway information. As compared with FIG. 6 of the first embodiment, an item of an access token is added. In the item of the access token, an access token issued by the access control unit 217 to the gateway device 110 that has made the gateway authentication request, is stored in association with the gateway device 110 that has made the gateway authentication request.

FIG. 18 illustrates an example of the connection setting information. As compared with FIG. 4 of the first embodiment, an access token is added to the setting item, and a value of the corresponding access token is stored in the setting value. After authentication by the server device 210 is completed, the server connection control unit 114 of the gateway device 110 communicates with the server device 210, including the access token.

Figure 19:
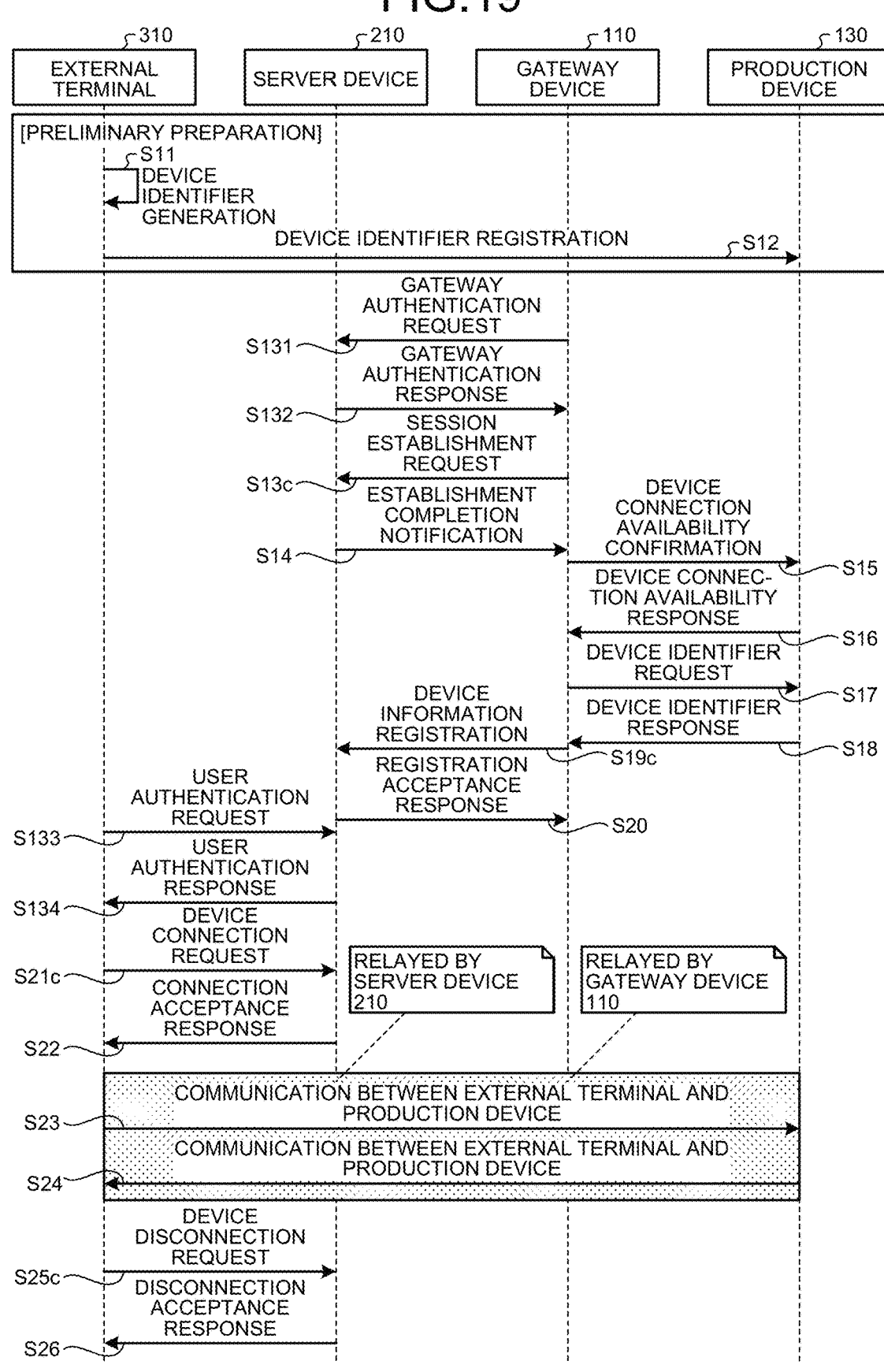
FIG. 19 is a sequence diagram illustrating an example of a procedure of a remote connection method in the remote system according to the fourth embodiment.

FIG. 19 is a sequence diagram illustrating an example of a procedure of a remote connection method in the remote system according to the fourth embodiment. Note that, hereinafter, parts identical to those in FIG. 7 of the first embodiment will not be described, and different parts will be described.

Before the session establishment request in step S13, the server connection control unit 114 of the gateway device 110 transmits a gateway authentication request including gateway authentication information which is information for gateway authentication, to the server device 210 (step S131). An example of the gateway authentication information is a gateway ID and a gateway PW. In one example, the gateway authentication information is stored in the connection setting information of the connection-setting-information-storage-unit 113, but may be stored according to another method.

When the access control unit 217 of the server device 210 receives the gateway authentication request, the access control unit 217 checks whether the gateway authentication information in the gateway authentication request indicates the gateway device 110 registered in the gateway information. When the access control unit 217 can confirm as the registered gateway device 110, the access control unit 217 generates an access token for omitting subsequent gateway authentication, and transmits a gateway authentication response including the access token to the gateway device 110 (step S132). The access control unit 217 registers the generated access token, into the record of the corresponding gateway device 110 in the gateway information of the gateway information storage unit 214. Note that the access token may be managed according to another method as long as the access token can be associated with the gateway device 110 that has been authenticated.

Upon receiving the gateway authentication response, the server connection control unit 114 of the gateway device 110 registers the access token included in the gateway authentication response, into the connection setting information of the connection-setting-information-storage-unit 113. The server connection control unit 114 of the gateway device 110 includes the access token in subsequent communication with the server device 210. Therefore, when establishing a session, the server connection control unit 114 transmits a session establishment request including the access token (step S13c). The access control unit 217 of the server device 210 verifies the access token included in the session establishment request, and transmits the gateway authentication response in step S14 to the gateway device 110 when the access control unit 217 has confirmed that the gateway device 110 is an authorized one.

Further, when registering the device information, the server connection control unit 114 of the gateway device 110 transmits the device information registration including the access token (step S19c). The access control unit 217 of the server device 210 verifies the access token included in the device information registration, and transmits the registration acceptance response in step S20 to the gateway device 110 when the access control unit 217 has confirmed that the gateway device 110 is an authorized one.

Note that the session establishment request may also serve as the gateway authentication request in step S131. In this case, the server connection control unit 114 of the gateway device 110 transmits the session establishment request including the gateway authentication information in step S13 of FIG. 7. Similarly, the establishment completion notification may be combined with the gateway authentication response of step S132. In this case, the connection control unit 211 of the server device 210 transmits the establishment completion notification including the access token in step S14 of FIG. 7.

In addition, before the device connection request in step S21, the external terminal 310 transmits, to the server device 210, a user authentication request including user authentication information which is information for user authentication (step S133). An example of the user authentication information is constituted by a user ID and a user password.

Upon receiving the user authentication request, the access control unit 217 of the server device 210 checks whether the user authentication information in the user authentication request indicates a user registered in the user information. When the access control unit 217 has confirmed that the user corresponds to a user registered in the user information, the access control unit 217 generates an access token for omitting subsequent user authentication. Then, the access control unit 217 transmits a user authentication response including the access token to the external terminal 310 (step S134). The access control unit 217 registers the generated access token, into the record of the corresponding user in the user information of the user information storage unit 215. Note that the access token may be managed according to another method as long as the access token can be associated with the user who has been authenticated.

When the external terminal 310 receives the user authentication response, the external terminal 310 includes, in subsequent communication with the server device 210, the access token included in the user authentication response. Therefore, when making a request for device connection, the external terminal 310 transmits the device connection request including the access token to the server device 210 (step S21c). The access control unit 217 of the server device 210 verifies the access token included in the device connection request, and transmits a connection acceptance response in step S22 to the external terminal 310 when the access control unit 217 has confirmed that the user is an authorized user. Note that the access control unit 217 of the server device 210 may perform authorization not only by authenticating the user but also by setting the gateway device 110 and the production device 130 to be permitted for connection, in the access control information.

In addition, when requesting device disconnection, the external terminal 310 transmits the device disconnection request including the access token, to the server device 210 (step S25c). The access control unit 217 of the server device 210 verifies the access token included in the device disconnection request, and transmits the disconnection acceptance response in step S26 to the external terminal 310 when the access control unit 217 has confirmed that the user is an authorized user.

Note that the device connection request may be combined with the user authentication request in step S133. In this case, the external terminal 310 transmits the device connection request including the user authentication information in step S21 of FIG. 7. Similarly, the connection acceptance response may be combined with the user authentication response in step S134. In this case, the connection control unit 211 of the server device 210 transmits the connection acceptance response including the access token in step S22 of FIG. 7.

In the above description, the operation of authentication and authorization using the access token is taken as an example, but other techniques for performing authentication and authorization may be used.

In the fourth embodiment, by performing user authentication of the external terminal 310 and authentication of the gateway device 110, it is possible to authenticate and authorize that the users of the external terminal 310 and the gateway device 110 are authorized users. As a result, there is an effect of being able to enhance security, as compared with the cases of the first to third embodiments.

Further, in the above description, a case has been described as an example in which the user authentication of the external terminal 310 and the authentication of the gateway device 110 are applied to the first embodiment, but similar effects can be obtained even when the user authentication of the external terminal 310 and the authentication of the gateway device 110 are applied to the second and third embodiments.

Fifth Embodiment

In a fifth embodiment, a case will be described in which the remote system 1 is applied to an environment in which countermeasures from the viewpoint of information security are enhanced by using a firewall, an unauthorized intrusion detection system (IDS), an unauthorized intrusion prevention system (IPS), or a web application firewall (WAF).

Figure 20:
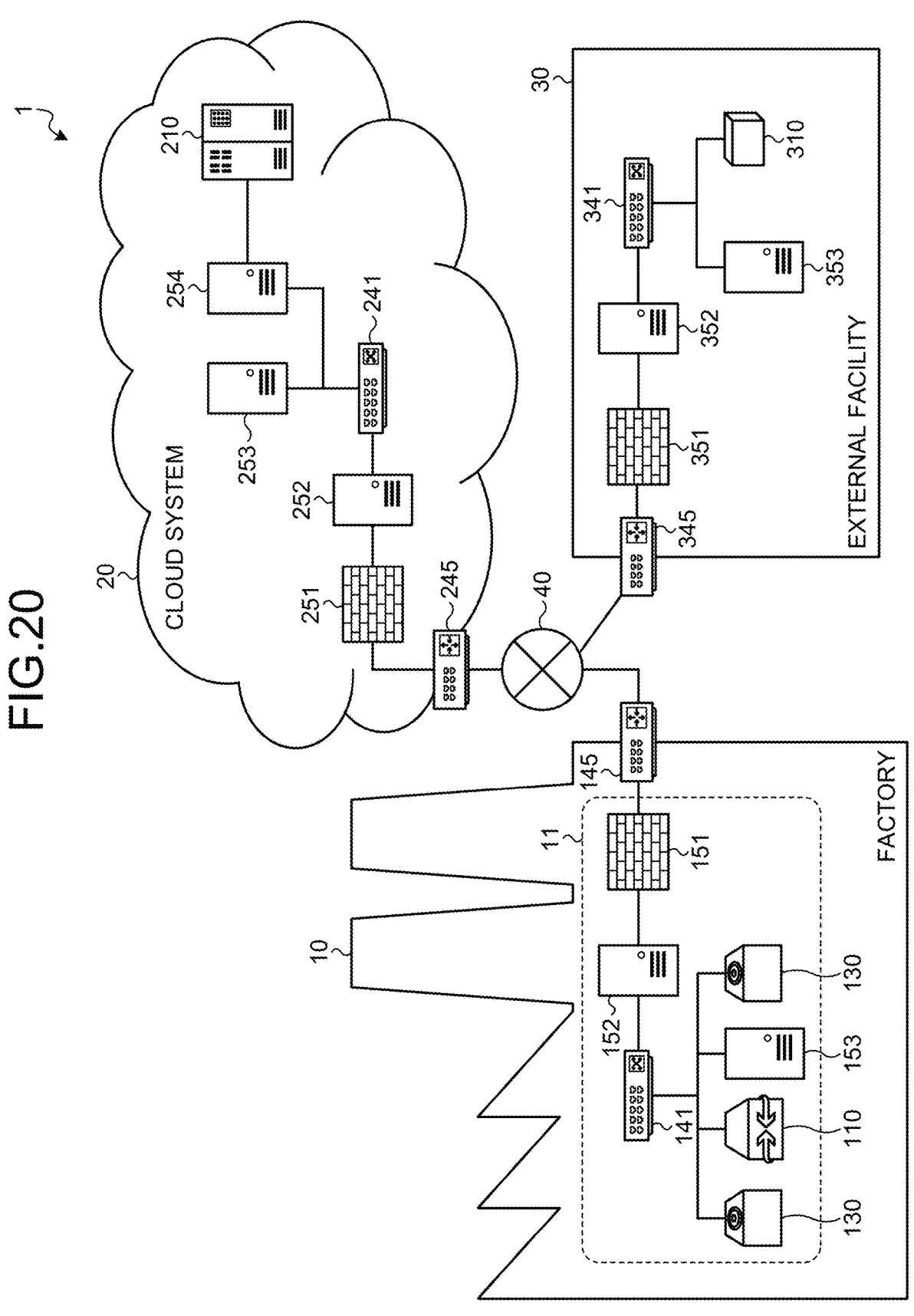
FIG. 20 is a diagram schematically illustrating an example of a configuration of a remote system according to a fifth embodiment.

FIG. 20 is a diagram schematically illustrating an example of a configuration of a remote system according to the fifth embodiment. Note that components identical to those in FIG. 1 of the first embodiment are denoted by the identical reference numerals, and the description thereof will be omitted. In the remote system 1 of the fifth embodiment, a device for improving countermeasures in terms of information security is further provided in each of the in-factory network 11, the cloud system 20, and the external facility 30 of the first embodiment. Examples of countermeasures for information security include setting of port forwarding to the routers 145, 245, and 345, setting of a filter to a firewall, and the like.

The in-factory network 11 includes a firewall 151 disposed between the router 145 and the switching hub 141, an IPS 152 disposed between the firewall 151 and the switching hub 141, and an IDS 153 disposed in a network to which the gateway device 110 belongs. The firewall 151 has a function of blocking an unauthorized packet from the outside to the inside of the in-factory network 11 and allowing a permitted packet to pass. The IPS 152 is a device that inspects content of a packet and blocks unauthorized communication. The IDS 153 is a device that inspects contents of a packet and detects unauthorized access and infiltration. Note that FIG. 20 illustrates a case where all of the firewall 151, the IPS 152, and the IDS 153 are provided in the in-factory network 11, but a configuration may be adopted in which one or more of these are provided.

The cloud system 20 further includes a switching hub 241, a firewall 251, an IPS 252, an IDS 253, and a WAF 254. The server device 210 is connected to the WAF 254, and the IDS 253 and the WAF 254 are connected via one switching hub 241. The WAF 254 has a function of protecting a web application that is provided by the server device 210 and connects the production device 130 with the external terminal 310, from an attack that abuses vulnerability of the web application. The firewall 251 is disposed between the router 245 and the switching hub 241, and the IPS 252 is disposed between the firewall 251 and the switching hub 241. Note that FIG. 20 illustrates a case where all of the firewall 251, the IPS 252, the IDS 253, and the WAF 254 are provided in the cloud system 20, but a configuration may be adopted in which one or more of these are provided.

The external facility 30 further includes a switching hub 341, a firewall 351, an IPS 352, and an IDS 353. The external terminal 310 and the IDS 353 are connected via one switching hub 341. The firewall 351 is disposed between the router 345 and the switching hub 341, and the IPS 352 is disposed between the firewall 351 and the switching hub 341. Note that FIG. 20 illustrates a case where all of the firewall 351, the IPS 352, and the IDS 353 are provided in the external facility 30, but a configuration may be adopted in which one or more of these are provided.

In the firewall 151 in the factory 10 illustrated in FIG. 20, packet filtering by a stateful inspection function is often performed as a method of preventing unauthorized access by a third party. The stateful inspection function is a function of dynamically opening or closing a port by viewing content of a packet passing through the firewall 151. In this case, the session establishment request sent from the gateway device 110 inside the factory 10 to the external server device 210 can pass through the firewall 151 since the session establishment request is communication to be sent to the outside. Based on a mechanism of the stateful inspection function, the establishment completion notification in step S14, which is a response corresponding to the session establishment request in step S13, can also pass through the firewall 151.

In addition, even in the firewall 151 that does not use the stateful inspection function, unless intentionally set, communication sent to the outside and a response corresponding thereto can normally pass through the firewall 151.

In the IDS 153 and the IPS 152 in the factory 10 illustrated in FIG. 20, detecting an unauthorized act from the outside to the remote system 1 and the in-factory network 11 is a normal operation, and also in this case, communication between the gateway device 110 and the server device 210 is not inhibited.

Similarly to the factory 10, in the firewall 351, the IDS 353, and the IPS 352 in the external facility 30 illustrated in FIG. 20, communication is not inhibited regarding communication to the outside, such as communication from the external terminal 310 inside the external facility 30 to the external server device 210.

In the firewall 251 in the cloud system 20 illustrated in FIG. 20, a setting is made to permit communication for the remote system 1 transmitted from the gateway device 110 and the external terminal 310. In addition, setting for the IDS 253, the IPS 252, and the WAF 254 are performed as necessary so that communication for the remote system 1 is not detected as an unauthorized behavior.

Furthermore, in the in-factory network 11, when a web server is disposed between the router 145 and the firewall 151, the router 145 is set such that the web server can be accessed from the outside of the in-factory network 11. In such a case, setting is performed on the firewall 151, which is a network device, to permit connection from the inside to the outside of the in-factory network 11 and reject connection from the outside to the inside. Therefore, in such a case, the firewall 151 has a function equivalent to that of the router 145 in the first embodiment.

As described above, the remote system 1 according to the fifth embodiment can be applied to a network system in which a device for enhancing countermeasures in terms of information security is disposed, and used without making a special setting for the remote system 1. Further, also in this case, it is possible to establish communication between the external terminal 310 and the production device 130 via the server device 210, without changing settings of the router 145 disposed between the in-factory network 11 and the wide area network 40, the router 245 disposed between the cloud system 20 and the wide area network 40, and the router 345 disposed between the external facility 30 and the wide area network 40.

Sixth Embodiment

In a sixth embodiment, a configuration will be described in which redundancy in remote access environment is given to the remote system 1 described in the first embodiment, in which the production device 130 is given with a function of the gateway device 110 and used in combination with the gateway device 110.

Figure 21:
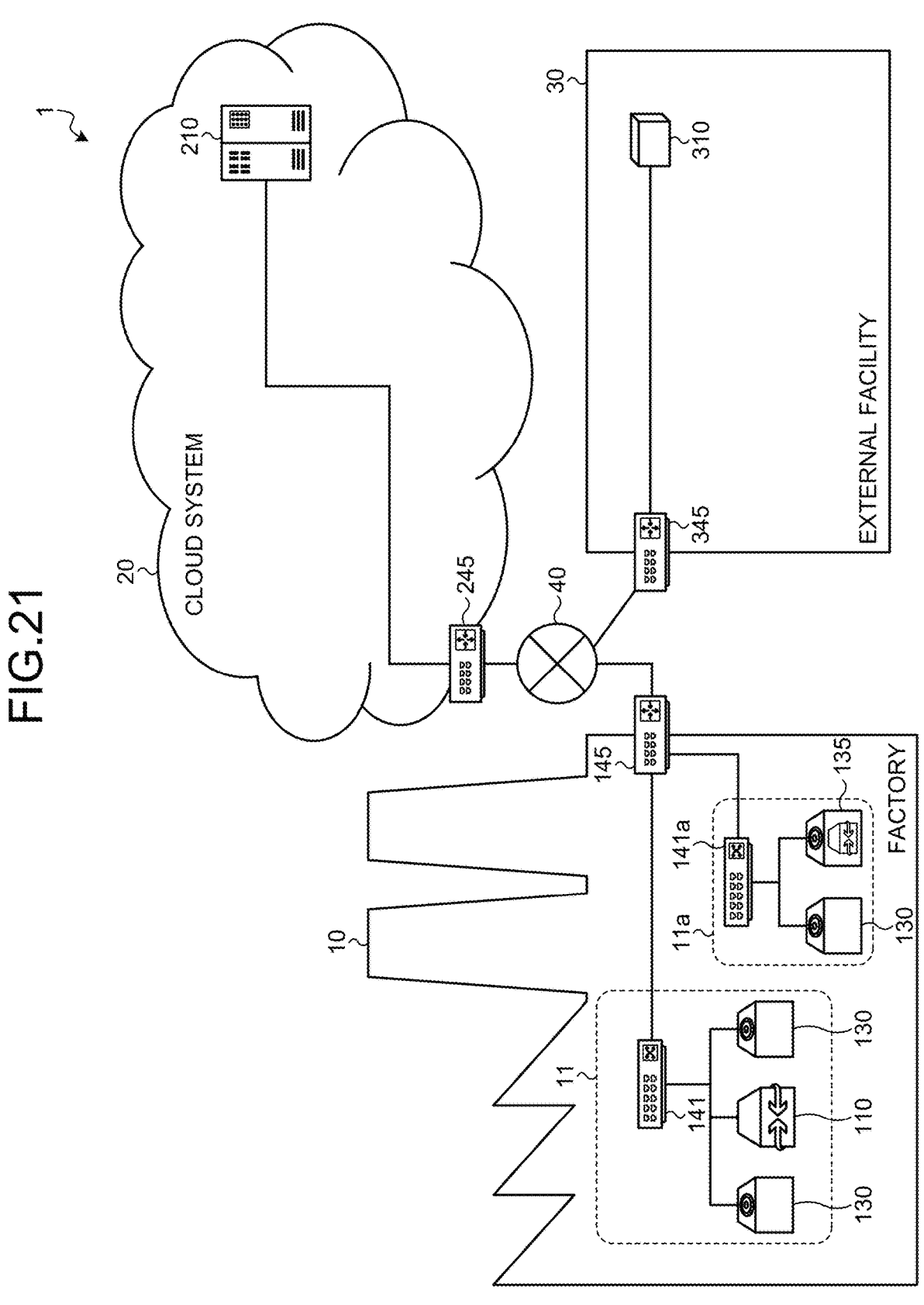
FIG. 21 is a diagram schematically illustrating an example of a configuration of a remote system according to a sixth embodiment.

FIG. 21 is a diagram schematically illustrating an example of a configuration of a remote system according to the sixth embodiment. Note that components identical to those in FIG. 1 of the first embodiment are denoted by the identical reference numerals, and the description thereof will be omitted. The remote system 1 of the sixth embodiment includes a plurality of in-factory networks 11 and 11a in the factory 10. The in-factory network 11 has a configuration in which the gateway device 110 and one or more production devices 130 are connected via the switching hub 141, similarly to that described in the first embodiment. The in-factory network 11a includes a production device 135 with a gateway function, one or more production devices 130, and a switching hub 141a. The switching hub 141a causes the production device 135 with the gateway function and one or more production devices 130 to constitute one in-factory network 11a. Each of the switching hubs 141 and 141a is connected to the router 145.

Figure 22:
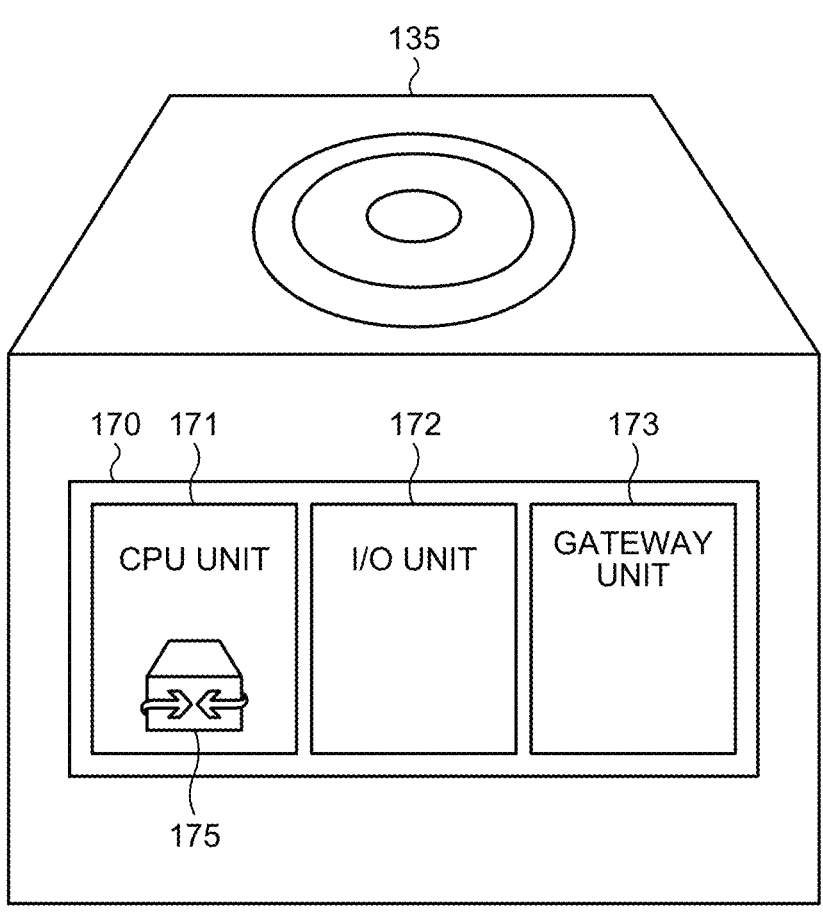
FIG. 22 is a perspective view schematically illustrating an example of a configuration of a production device with a gateway function to be used in the remote system according to the sixth embodiment.

FIG. 22 is a perspective view schematically illustrating an example of a configuration of a production device with a gateway function to be used in the remote system according to the sixth embodiment. Note that, in FIG. 22, a case will be described as an example in which a control device in the production device 135 with the gateway function is a PLC. The production device 135 with the gateway function includes a PLC configuration unit 170. The PLC configuration unit 170 includes a central processing unit (CPU) unit 171, an input/output (I/O) unit 172, and a gateway unit 173.

The CPU unit 171 performs computation according to a control program, and controls a control target in the production device 135 with the gateway function. The I/O unit 172 inputs and outputs signals to and from a control target, a sensor, and the like. The gateway unit 173 has the function of the gateway device 110 described in the first to fifth embodiments. However, the I/O unit 172 and the gateway unit 173 are not essential in the sixth embodiment. When the gateway unit 173 is omitted, the gateway unit 173 can be substituted by incorporating a gateway function 175 in the CPU unit 171. Note that, for the sake of description, FIG. 22 illustrates a case where the PLC configuration unit 170 includes the gateway unit 173 and the CPU unit 171 incorporates the gateway function 175, but it is sufficient that any one of the gateway unit 173 and the gateway function 175 is provided in practice.

Figure 23:
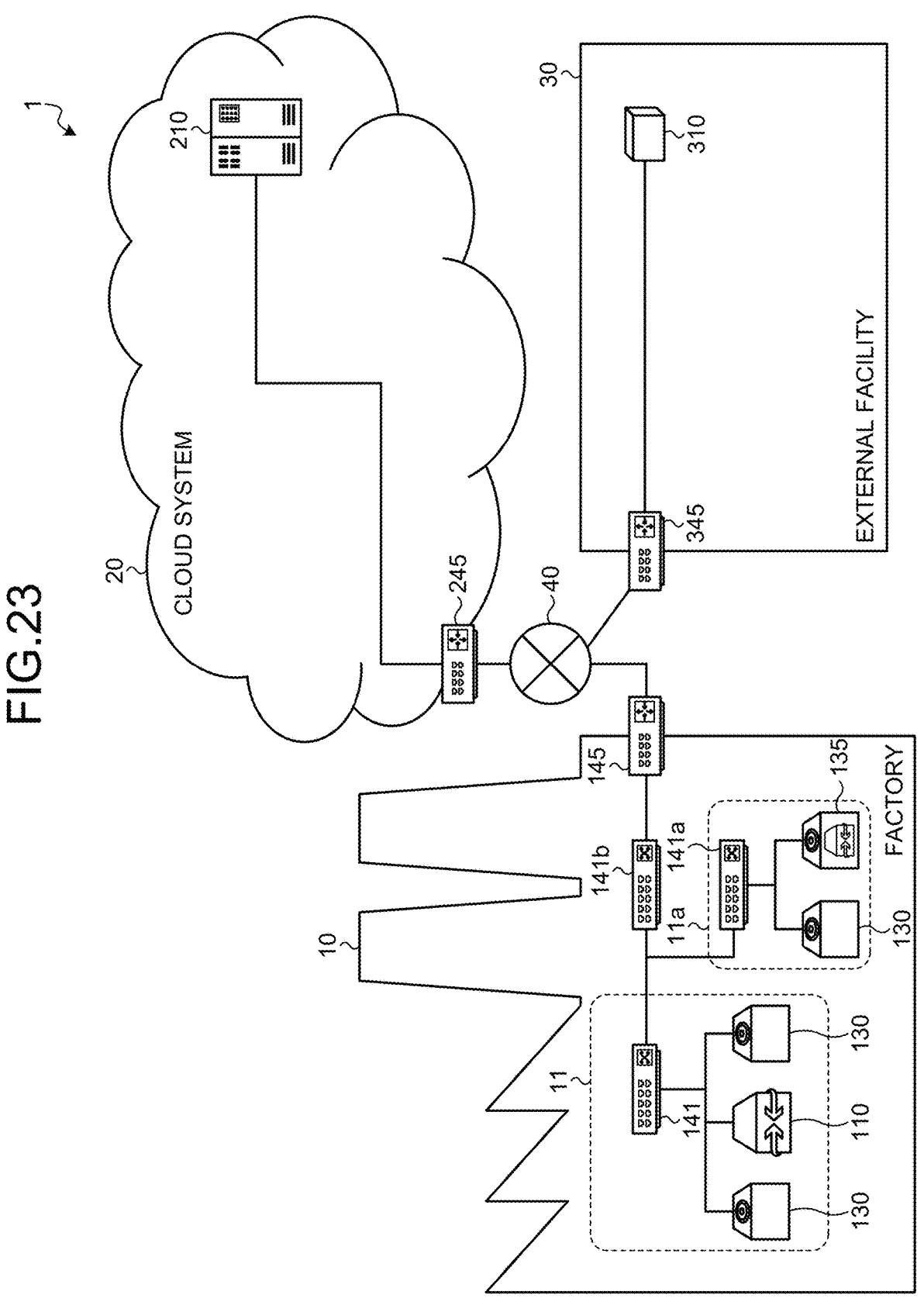
FIG. 23 is a view schematically illustrating another example of a configuration of the remote system according to the sixth embodiment.

FIG. 23 is a view schematically illustrating another example of a configuration of the remote system according to the sixth embodiment. Note that components identical to those in FIG. 1 of the first embodiment and FIG. 21 of the sixth embodiment are denoted by the identical reference numerals, and the description thereof will be omitted. While FIG. 21 illustrates a case where the in-factory network 11 and the in-factory network 11a are not connected, in FIG. 23, the in-factory network 11 and the in-factory network 11a are connected via the switching hub 141b. By adopting such a form, when any one of the gateway device 110 and the production device 135 with the gateway function fails, communication with the server device 210 can be continued by using another. That is, redundancy is imparted to communication via the gateway device 110 and the production device 135 having the gateway function.

The CPU unit 171 having the gateway function 175 or the gateway unit 173 has a function equivalent to that of the gateway device 110 described in the first to fifth embodiments, so that it is possible to relay remote access to devices other than the production device 135 with the gateway function, such as an HMI and an inverter. In this case, a communication path has a configuration such that the gateway unit 173 or the CPU unit 171 having the gateway function 175 directly communicates with the server device 210.

Further, in the configuration having the redundancy illustrated in FIG. 23, device information in the device-information-storage-unit 213 of the server device 210 has a configuration in which a plurality of devices each having a function of gateway can be registered for a device identifier of one production device 130. The connection control unit 211 of the server device 210 may select a device with a function of gateway that is installed in a path having the best communication environment such as communication availability from among paths to the target production device 130, to perform a relay operation.

In the above description, it is described that the PLC configuration unit 170 has the gateway function in the production device 135 with the gateway function as an example, but other devices such as an inverter may have the gateway function.

In the sixth embodiment, the in-factory network 11 including the gateway device 110 and the in-factory network 11a including the production device 135 with the gateway function are installed in the factory 10. As a result, the production devices 130 in the factory 10 can be divided into a plurality of groups for each device having the gateway function. In addition, by connecting the plurality of in-factory networks 11 and 11a including the device having a gateway function, it is possible to provide redundancy to a remote access environment.

Figure 24:
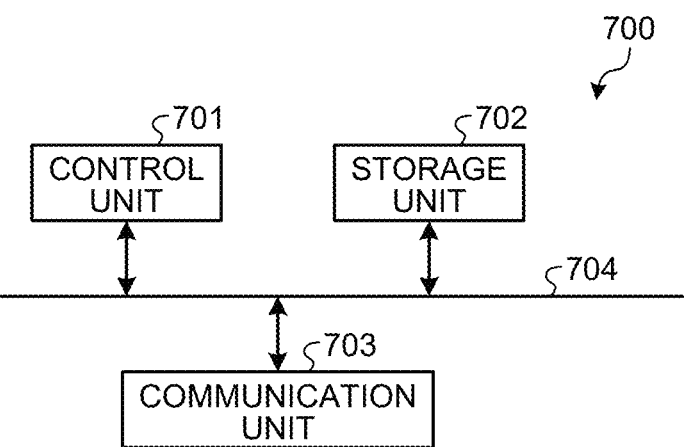
FIG. 24 is a diagram illustrating an example of a hardware configuration of a computer system that realizes a gateway device and a server device of the remote system according to the first to sixth embodiments.

Here, a hardware configuration of the gateway device 110 and the server device 210 will be described. The gateway device 110 and the server device 210 according to the first to sixth embodiments are specifically implemented by a computer system. FIG. 24 is a diagram illustrating an example of a hardware configuration of the computer system that implements the gateway device and the server device of the remote system according to the first to sixth embodiments. As illustrated in FIG. 24, this computer system 700 includes a control unit 701, a storage unit 702, and a communication unit 703, which are connected via a system bus 704.

In FIG. 24, the control unit 701 is, for example, a CPU or the like. The control unit 701 executes a remote connection program in which any one of the remote connection methods explained in the first to sixth embodiments are described. The storage unit 702 includes various memories such as a random access memory (RAM) and a read only memory (ROM), and a storage device such as a hard disk drive (HDD) or a solid state drive (SSD), and stores a program to be executed by the control unit 701, necessary data obtained in a process of processing, and the like. Further, the storage unit 702 is also used as a temporary storage area of the program. The communication unit 703 is a communication circuit or the like that performs communication processing. The communication unit 703 may include a plurality of communication circuits each of which supports corresponding one of a plurality of communication schemes. Note that FIG. 24 is an example, and the configuration of the computer system 700 is not limited to the example of FIG. 24.

Here, an operation example of the computer system 700 until a state where the remote connection program according to any one of the first to sixth embodiments becomes executable will be described. In the computer system 700 having the above-described configuration, for example, the remote connection program is installed in the storage unit 702 from a CD-ROM or DVD-ROM set in a compact disc (CD)-ROM drive or a digital versatile disc (DVD)-ROM drive (not illustrated). Then, when the remote connection program is executed, the remote connection program read from the storage unit 702 is stored in an area serving as a main storage device of the storage unit 702. In this state, the control unit 701 executes the remote connection processing in the gateway device 110 or the server device 210 of the first to sixth embodiments, in accordance with the remote connection program stored in the storage unit 702.

Note that, in the above description, the remote connection program is provided using a CD-ROM or a DVD-ROM as a recording medium. However, without limiting to this, for example, a program provided by a transmission medium such as the Internet via the communication unit 703 may be used depending on the configuration of the computer system 700, a capacity of the program to be provided, and the like.

The production-device-connection-control-unit 111 and the server connection control unit 114 of the gateway device 110 illustrated in FIGS. 2 and 13 are implemented by the control unit 701 of FIG. 24. The connection-device-information-storage-unitdevice-information-storage-unit 112 and the connection-setting-information-storage-unit 113 of the gateway device 110 illustrated in FIGS. 2 and 13 are a part of the storage unit 702 illustrated in FIG. 24.

In addition, the connection control unit 211, the device management unit 212, and the access control unit 217 of the server device 210 illustrated in FIGS. 2 and 13 are implemented by the control unit 701 of FIG. 24. The device-information-storage-unit 213, the gateway information storage unit 214, the user information storage unit 215, and the access control information storage unit 216 of the server device 210 illustrated in FIGS. 2 and 13 are a part of the storage unit 702 illustrated in FIG. 24.

The configurations illustrated in the above embodiments illustrate one example and can be combined with another known technique, and it is also possible to combine embodiments with each other and omit and change a part of the configuration without departing from the subject matter of the present disclosure.

REFERENCE SIGNS LIST 1 remote system; 10 factory; 11, 11a in-factory network; 20 cloud system; 30 external facility; 40 wide area network; 110 gateway device; 111 production-device-connection-control-unit; 112 connection-device-information-storage-unit-device-information-storage-unit; 113 connection-setting-information-storage-unit; 114 server connection control unit; 130 production device; 131 robot arm; 133 camera; 135 production device with gateway function; 141, 141a, 141b, 241, 341 switching hub; 145, 245, 345 router; 151, 251, 351 firewall; 152, 252, 352 IPS; 153, 253, 353 IDS; 170 PLC configuration unit; 171 CPU unit; 172 I/O unit; 173 gateway unit; 175 gateway function; 210 server device; 211 connection control unit; 212 device management unit; 213 device-information-storage-unit; 214 gateway information storage unit; 215 user information storage unit; 216 access control information storage unit; 217 access control unit; 254 WAF; 310 external terminal.

The invention claimed is:

1. A remote system for implementing remote connection to a production device by an external terminal, the remote system comprising:
   a gateway;
   a server device to relay communication between the production device and the external terminal via a local area network including the production device and the gateway, the local area network and the server device being connected via a wide area network, the server device being situated outside of the local area network, the external terminal being an information communication device; and
   a network device situated between the gateway and the server device, the network device to permit connection from an inside of the local area network to an outside of the local area network and reject all connection from the outside of the local area network to the inside of the local area network, the network device being installed at (a) a connection point of the local area network and the wide area network or (b) between (i) the connection point and (ii) the production device, wherein
   the gateway requests the server device to establish a first session between the gateway and the server device, and
   the server device:
      stores device information in which device identification information for identifying the production device is associated with gateway identification information for identifying the gateway connectable to the production device;
      compares, when receiving a device connection request including device identification information for identifying a target production device from the external terminal, the device identification information in the device connection request with the device identification information for identifying the production device;
      establishes the first session in response to a request for establishment of the first session;
      establishes a second session between the external terminal and the server device when the device identification information of the target production device is included in the device information as a result of the comparison;
      acquires, from the device information, the gateway identification information corresponding to the device identification information in the device connection request, the first session being established between the server device and the gateway that corresponds to the acquired gateway identification information;
      links the first session and the second session; and
      relays the communication between the external terminal and the production device by using the first session and the second session that are linked with each other.

2. The remote system according to claim 1, wherein
   the gateway further searches for the production device connected to the local area network and requests the production device to transmit the device identification information, and
   the gateway registers the device identification information in the server device when receiving the device identification information from the production device.

3. The remote system according to claim 2, wherein the device identification information of the production device is registered in the production device by the external terminal.

4. The remote system according to claim 2, wherein the production device has a function of generating the device identification information.

5. The remote system according to claim 1, wherein the gateway further searches for the production device connected to the local area network and generates the device identification information of the production device, and the gateway registers the device identification information in the server device when generating the device identification information.

6. The remote system according to claim 1, wherein the server device further:

stores gateway information for authenticating the gateway;

compares the gateway information with gateway authentication information for authenticating the gateway, the gateway authentication information being transmitted from the gateway; and permits establishment of the first session between the server device and the gateway when the gateway is an authorized gateway as a result of the comparison.

7. The remote system according to claim 1, wherein the server device further:

stores user information for authenticating a user of the external terminal;

compares the user information with user authentication information for authenticating the user, the user authentication information being transmitted from the external terminal; and permits access by the external terminal to the production device when the user is an authorized user as a result of comparison.

8. The remote system according to claim 7, wherein the server device further:

stores access control information in which access authority to the production device and the gateway is set for each user, and determines extent accessible by the user with reference to the access control information.

9. The remote system according to claim 1, further comprising one or more of a firewall, an unauthorized intrusion detection system to detect unauthorized communication, an unauthorized intrusion prevention system to block unauthorized communication, and a web application firewall to protect a web application from an attack that abuses vulnerability of the web application.

10. The remote system according to claim 9, wherein the one or more of the firewall, the unauthorized intrusion detection system to detect the unauthorized communication, the unauthorized intrusion prevention system to block the unauthorized communication, and the web application firewall to protect the web application from the attack that abuses vulnerability of the web application is situated between the network device and the gateway.

11. The remote system according to claim 1, wherein the gateway is the production device having a function of gateway.

12. The remote system according to claim 1, wherein a plurality of the local area network is provided, and gateways of the plurality of the local area networks each corresponding to the gateway are connected to one another.

13. The remote system according to claim 1, wherein the network device includes a firewall that permits connection from the inside of the local area network to the outside of the local area network and rejects all connection from the outside of the local area network to the inside of the local area network.

14. A remote connection method for implementing remote connection to a production device by an external terminal, the method comprising:

relaying, by a server device, communication between the production device and the external terminal via a local area network including the production device and a gateway, the local area network and the server device being connected via a wide area network, the server device being situated outside of the local area network, the external terminal being an information communication device;

permitting connection from an inside of the local area network to an outside of the local area network and rejecting all connection from the outside of the local area network to the inside of the local area network, by a network device situated between the gateway and the server device and installed at (a) a connection point of the local area network and the wide area network or (b) between (i) the connection point and (ii) the production device;

requesting, by the gateway, the server device to establish a first session between the gateway and the server device;

establishing, by the server device the first session in response to a request for establishing the first session;

checking, by the server device, whether device identification information included in a device connection request is included in device information when the server device receives, from the external terminal, the device connection request including the device identification information for identifying a target production device designated from the external terminal, wherein the device identification information for identifying the production device is associated with gateway identification information for identifying the gateway connectable to the production device in the device information;

establishing, by the server device, a second session between the external terminal and the server device when the device identification information included in the device connection request is included in the device information as a result of the checking;

acquiring, by the server device, from the device information, the gateway identification information corresponding to the device identification information included in the device connection request;

linking, by the server device the first session and the second session; and relaying, by the server device, the communication between the external terminal and the production device by using the first session and the second session that are linked with each other.

15. A non-transitory computer readable storage medium storing a program for operating a server device to be used in a remote system that implements remote connection to a production device by an external terminal, the program causing the server device to execute:

relaying, by a server device, communication between the production device and the external terminal via a local area network including the production device and a gateway, the local area network and the server device being connected via a wide area network, the server device being situated outside of the local area network, the external terminal being an information communication device;

storing device information in which identification information for identifying the production device is associated with gateway identification information for identifying the gateway connectable to the production device;

receiving, from the external terminal, a device connection request including device identification information for identifying a target production device designated from the external terminal;

checking whether the device identification information included in the device connection request is included in the device information;

establishing a first session in response to a request, from the gateway, for establishing the first session between the gateway and the server device, the request for establishing the first session being received via a network device situated between the gateway and the server device and installed at (a) a connection point of the local area network and the wide area network or (b) between (i) the connection point and (ii) the production device, the network device permitting connection from an inside of the local area network to an outside of the local area network and rejecting all connection from the outside of the local area network to the inside of the local area network;

establishing a second session between the external terminal and the server device when the device identification information included in the device connection request is included in the device information as a result of the checking;

acquiring, from the device information, the gateway identification information corresponding to the device identification information included in the device connection request;

linking the first session and the second session, the first session being established between the server device and the gateway that corresponds to the acquired gateway identification information; and relaying communication between the external terminal and the production device by using the first session and the second session that are linked with each other.

*    *    *    *    *